(12) United States Patent
Caiafa et al.

(10) Patent No.: US 10,439,393 B2
(45) Date of Patent: Oct. 8, 2019

(54) SWITCH SYSTEMS FOR CONTROLLING CONDUCTION OF MULTI-PHASE CURRENT

(71) Applicant: General Electric Company, Schenectady, NY (US)

(72) Inventors: Antonio Caiafa, Albany, NY (US); Ahmed Elasser, Niskayuna, NY (US); Dong Dong, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 333 days.

(21) Appl. No.: 15/339,266

(22) Filed: Oct. 31, 2016

(65) Prior Publication Data

US 2018/0123468 A1    May 3, 2018

(51) Int. Cl.
*H02J 3/00* (2006.01)
(52) U.S. Cl.
CPC .................................... *H02J 3/005* (2013.01)
(58) Field of Classification Search
None
See application file for complete search history.

(56) References Cited

U.S. PATENT DOCUMENTS

| | | | |
|---|---|---|---|
| 4,189,649 A | 2/1980 | Przywozny et al. | |
| 5,182,464 A | 1/1993 | Woodworth et al. | |
| 5,386,147 A | 1/1995 | Bonneau et al. | |
| 5,930,125 A | 7/1999 | Hitchcock et al. | |
| 7,542,250 B2 | 6/2009 | Premerlani et al. | |
| 8,353,352 B2 | 1/2013 | Leitch | |
| 8,861,162 B2 | 10/2014 | Fuller et al. | |
| 2008/0013351 A1* | 1/2008 | Alexander | H02M 3/1582 363/123 |
| 2015/0330195 A1 | 11/2015 | Dong et al. | |

FOREIGN PATENT DOCUMENTS

| CN | 203537360 U | 4/2014 |
|---|---|---|
| WO | 2013190291 A2 | 12/2013 |

OTHER PUBLICATIONS

Nielsen; Design and Control of a Dynamic Voltage Restorer: Aalborg University, Denmark; 2002; pp. 20-119.
Chan et al.; Innovative System Solutions for Power Quality Enhancement; pp. 1-8.

* cited by examiner

*Primary Examiner* — Theinvu V Tran
*Assistant Examiner* — David M Stables
(74) *Attorney, Agent, or Firm* — Laura L. Pollander

(57) ABSTRACT

A switching system includes a switching assembly and a transformer. The switching assembly includes multiple sets of switch cells conductively coupled to different power conductors that extend between a power source and a load and conduct different phases of current. Each set of switch cells controls conduction of a different phase of current to the load. The transformer has a primary winding and multiple secondary windings that are conductively coupled to the sets of switch cells. Responsive to receiving an activation control signal from the transformer via the secondary windings, the sets of switch cells are configured to activate to conduct the multiple phases of current from the power source to the load along the power conductors.

12 Claims, 11 Drawing Sheets

SWITCH SYSTEMS FOR CONTROLLING CONDUCTION OF MULTI-PHASE CURRENT

FIELD

Embodiments of the subject matter described herein relate to controlling conduction of multi-phase current from a power source to one or more loads.

BACKGROUND

Electrical devices may use switches to control the conduction of current, such as to allow conduction or to stop conduction, from a power source to one or more loads. Some electrical devices may be used in harsh conditions and, as a result, have limited options for power supply, drive controls, and cabling. For example, electric submersible pumps (ESPs) can be used in oil wells or the like. The ESPs may need to be controlled to pump oil or other compounds out of wells that extend great depths into the earth. Since the ESPs operate at significant depths, pulling an ESP to the surface for repair and/or to replace a component can be costly and time-consuming, and also may force a resource-extraction process to stop or at least slow down until the ESP is returned to the well.

Furthermore, the pumps, motors, electrical switches, drive controls, and the like, of the ESPs can be subjected to harsh conditions, such as temperatures in excess of 200 degrees Celsius and/or pressures in excess of 20,000 pounds per square inch (e.g., 138,000 kilopascals). These conditions can limit the available mechanical switching solutions to control when multiple phases of current are supplied to the ESPs to control the operation thereof.

Additionally, the ESPs may be located at significant depths within the wells. In order to supply multiple phases of current to an ESP, multiple power cables or wires can be installed to extend from the surface down the well to the ESP to separately deliver different phases of current to the ESP on different power cables or wires. Additional signal cables or wires are used to provide drive signals for the ESP and/or control signals for various electrical switches and other devices for operating the ESP. The lengths of cables or wires needed to deliver the current can be a significant cost to operate the ESPs, and in some circumstances can be approximately 40% or more of the total cost to operate the ESPs.

BRIEF DESCRIPTION

In one or more embodiments, a switching system is provided that includes a switching assembly for controlling conduction of multiple phases of current from a power source to a first load, and a transformer. The switching assembly includes multiple sets of switch cells conductively coupled to different power conductors that extend between the power source and the first load. The power conductors conduct different phases of current such that each set of switch cells is configured to control conduction of a different phase of current to the first load. The switch cells include first and second solid state switching devices having respective diodes. The diode of the first solid state switching device is conductively coupled in an opposite direction to the diode of the second solid state switching device. The transformer has a primary winding and multiple secondary windings that are conductively coupled to the sets of switch cells. The transformer is configured to convey an activation control signal from the primary winding to the sets of switch cells via the secondary windings. Responsive to receiving the activation control signal, the sets of switch cells are configured to activate to conduct the multiple phases of current from the power source to the first load along the power conductors.

In one or more embodiments, a switching system is provided that includes a switching assembly for controlling conduction of multiple phases of current from a power source to a first load, a transformer, and a switch controller. The switching assembly includes multiple sets of switch cells conductively coupled to different power conductors that extend between the power source and the first load. The power conductors conduct different phases of current such that each set of switch cells is configured to control conduction of a different phase of current to the first load. The switch cells include first and second solid state switching devices having respective diodes. The diode of the first solid state switching device is conductively coupled in an opposite direction to the diode of the second solid state switching device. The transformer has a primary winding and multiple secondary windings that are conductively coupled to the sets of switch cells. The switch controller is conductively coupled to the primary winding via a pair of signal conductors. The switch controller is configured to transmit an activation control signal via the pair of signal conductors to the primary winding. The activation control signal is conveyed from the primary winding to the sets of switch cells via the secondary windings. Responsive to receiving the activation control signal, the sets of switch cells are configured to activate to conduct the multiple phases of current from the power source to the first load along the power conductors.

In one or more embodiments, a switching system is provided that includes a transformer and a switching assembly for controlling conduction of three-phase current from a power source to a motor of a subterranean pump that is disposed beneath a surface of earth for pumping a resource to the surface. The switching assembly includes three sets of switch cells disposed beneath the surface. Each of the three sets of switch cells is conductively coupled to a different power conductor of three power conductors that extend from the power source at the surface to the motor. The power conductors conduct different phases of current relative to one another such that each set of switch cells is configured to control conduction of a different phase of current to the motor. The switch cells include first and second solid state switching devices having respective diodes. The diode of the first solid state switching device is conductively coupled in an opposite direction to the diode of the second solid state switching device in the same switch cell. The transformer is configured to be disposed beneath the surface. The transformer includes a primary winding conductively coupled to a pair of signal conductors that extend from the primary winding to the surface. The transformer further includes at least three secondary windings that are conductively coupled to the three sets of switch cells. The transformer is configured to convey a control signal that is received from the surface via the pair of signal conductors to the three sets of switch cells via the secondary windings. The control signal is configured to at least one of activate the three sets of switch cells to conduct the three-phase current from the power source to the motor or deactivate the three sets of switch cells to stop conduction of the three-phase current from the power source to the motor.

DETAILED DESCRIPTION

Figure 1:
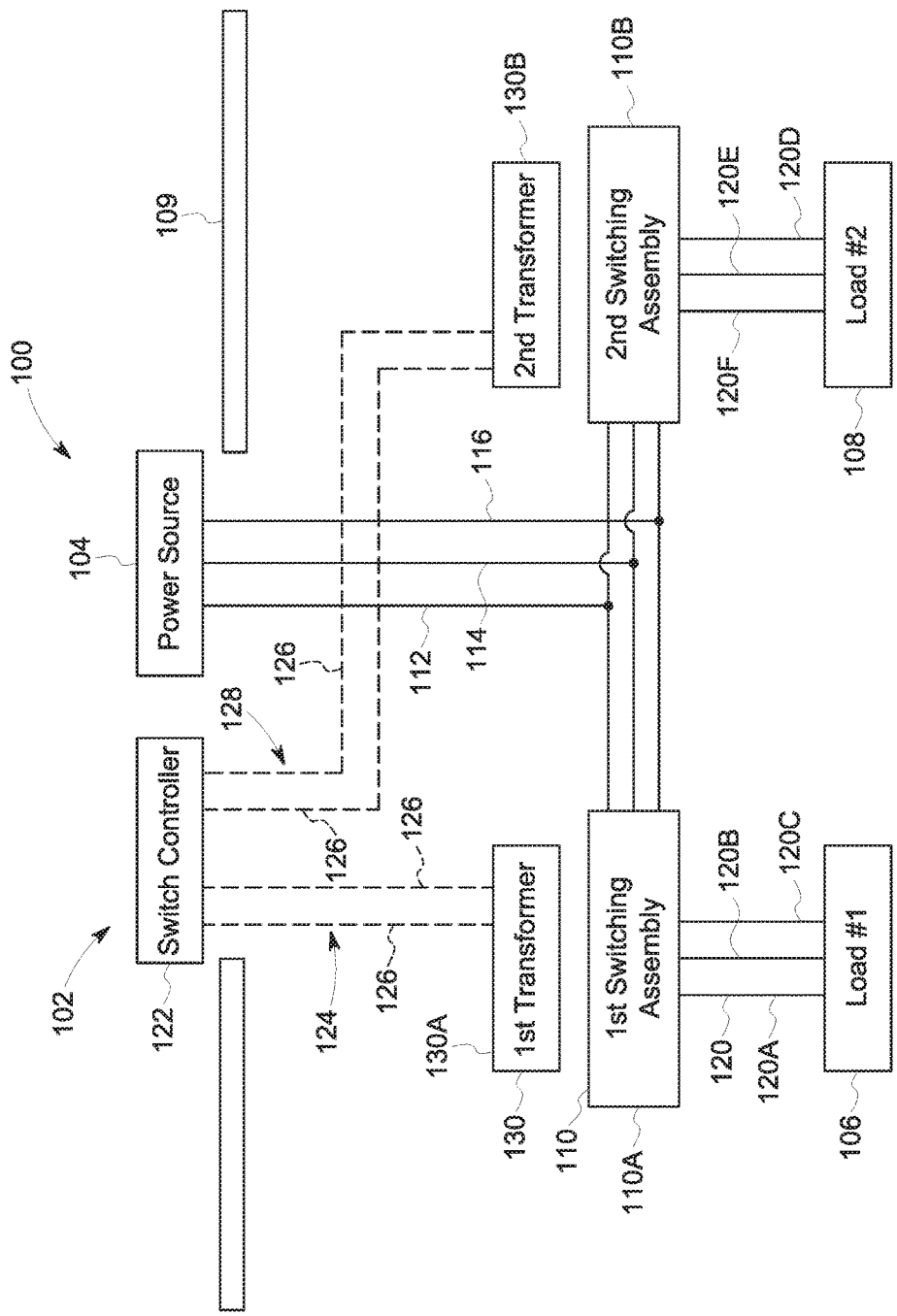
FIG. 1 is a schematic diagram of a power system and a switching system according to an embodiment.

The following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Although the various embodiments may be described herein within a particular operating environment, such as within a downhole well at a significant depth below the surface of earth, it should be appreciated that one or more embodiments are equally applicable for use with other configurations and systems, such as for different types of electrical devices and systems that are configured for use in harsh environments associated with, for example, high temperature, high pressure, polluted liquids and other contaminants, debris, and the like. For example, various embodiments are applicable to subterranean electric submersible pumps (ESPs) configured to be disposed within wells for resource extraction. However, it also should be appreciated that the switching systems described in the various embodiments herein may be applicable in other harsh environments, such as aeronautic or marine environments, and non-harsh environments. Hence, although one or more embodiments describe the switching systems in the context of subterranean resource-extraction devices, the various embodiments of the switching systems may be applied to control conduction of multi-phase current to other loads in other applications as well.

One or more embodiments of the inventive subject matter described herein may include a switching system with switch cells (e.g., including gate drive circuits) that control conduction of current to electric machines, such as ESPs. The switching system may be configured to control the conduction of multi-phase current along multiple power conductors (e.g., cables or wires) to ESPs or other electric machines. The switching system may simplify a gate drive circuit and arrangement relative to pre-existing gate drive circuits, such as by having fewer components and/or by being less complex. The components of the switching system are configured to be usable under high temperature conditions (e.g., greater than 150 degrees Celsius), without requiring the use of high temperature power supplies or gate driver chips. The switching system may use only passive components, such as diodes, capacitors, resistors, and transformers within the harsh environment to control conduction to one or more electric machines. The one or more embodiments of the switching system described herein may increase the reliability of the switch devices relative to pre-existing gate drive devices that use less reliable active components in harsh environments. The switching system may also be scalable to different voltage rating designs.

Furthermore, the switching system is configured to reduce a number of signal conductors used to control the switch devices. For example, in one embodiment, one pair of signal conductors is used to control the conduction of three-phase current to an electric machine, in which each of the three phases are conveyed along a different power conductor. Therefore, in addition to the power conductors which may be discrete cables or combined within a cable bundle, only the single pair of signal conductors is needed to extend the length of the well, for example, from the switch devices to a switch controller on the surface. The two signal conductors in the pair are used to provide a control loop for sending control signals. The pair of signal conductors may be contained within a single cable, such as a co-axial cable or a twin-axial cable. As such, a single control cable can be used to control the conduction of three-phase current along three different power conductors to an electric machine. Some pre-existing gate drive systems would use at least six signal conductors (e.g., contained within three or more discrete cables) for providing three-phase current to the electric machine. Since the wells can have depths up to two kilometers or more, reducing the number of signal conductors greatly reduces part costs by reducing the total length of copper cable that is required.

The insulation and signal synchronization between different switch cells of the switching system conductively coupled to different power conductors may be achieved by a passive, high-frequency transformer. For example, a pair of signal conductors provides control signals from a switch controller to a primary side of the transformer, and the transformer provides the control signals to multiple switch cells on the secondary side of the transformer. Therefore, a plurality of switches conductively coupled to different power conductors conveying different phases of current may be controlled with a single transformer. Furthermore, a reduced number of transformers or other control devices may be used in one or more embodiments, providing a cost reduction relative to systems that use more transformers than the embodiments of the switching system described herein.

In one or more embodiments, several gate drive circuit topologies are provided for high-voltage, bi-directional (e.g., in voltage and current) solid state switch devices. The switch devices described herein may be low profile, small footprint passive components with high reliability under high temperature conditions. The gate drive circuits are configured to achieve functions such as negative bias voltage and load switching with limited loss.

FIG. 1 is a schematic diagram of a power system 100 and a switching system 102 according to an embodiment. The power system 100 includes a power source 104 that provide electric power (e.g., electric current, such as alternating current) to plural loads 106, 108 (e.g., "Load #1" and "Load #2" in FIG. 1). While two loads 106, 108 are shown in FIG. 1, alternatively, more than two loads or a single load may be included in the power system 100. The power system 100 also includes multiple power conductors 112, 114, 116 (e.g., cables or insulated wires) that extend from the power source 104 and supply different phases of alternating current to the loads 106, 108. The power conductors 112, 114, 116, are configured to convey high currents, such as hundreds of Amperes. In the illustrated embodiment, the power system 100 includes three power conductors 112, 114, 116 that convey three different phases of current, such that the power source 104 provides three-phase current to the loads 106, 108. For example, a first phase of alternating current can be conducted from the power source 104 via a first power conductor 112, a different, second phase of the alternating current can be conducted from the same power source 104 via a second power conductor 114, and a different, third phase of the alternating current can be conducted from the same power source 104 via a third power conductor 116. However, the power system 100 in other embodiments may include more or less than three power conductors extending from the power source 104, and/or the power source 104 may supply multi-phase currents having more or less than three different phases, such as two phases of current.

In one embodiment, the loads 106, 108 represent two motors for a single subterranean pump that is configured to pump resources (e.g., oil, gas, etc.) from beneath the surface 109 of the earth to a location above the surface 109 of the earth. For example, while the subterranean pump operates, only one of the motors 106, 108 may be supplied electric power, and the other one of the motors 106, 108 is not supplied electric power. The use of two motors 106, 108 allows for one of the motors 106, 108 to be utilized as a back-up motor to reduce downtime in which the subterranean pump is non-operational caused by a motor overheating, maintenance of a motor, and/or replacement of a motor. The switching system 102 is configured to control the supply of electric current to the motors 106, 108, such as to switch from the first motor 106 receiving current (and the second motor 108 not receiving current) to the second motor 108 receiving current (and the first motor 106 not receiving current). Optionally, both motors 106, 108 may be operated concurrently, such as to provide more power than a single motor 106 or 108 can provide independently. Therefore, at a certain time both motors 106, 108 may be operating, only the motor 106 is operating, only the motor 108 is operating, or neither motor 106, 108 is operating. In another embodiment, instead of two motors of a single pump, the two loads 106, 108 can represent two different subterranean pumps within a downhole environment. In alternative embodiments, the loads 106, 108 may be associated with other applications, such as aviation or marine applications.

The switching system 102 shown in FIG. 1 includes two switching assemblies 110 (e.g., switching assemblies 110A and 110B) that control conduction of the multi-phase current from the power source 104 to the loads 106, 108. For example, a first switching assembly 110A controls conduction of the current from the power source 104 to the first load 106, and a second switching assembly 110B controls conduction of the current from the power source 104 to the second load 108. The two switching assemblies 110A, 110B may be identical or at least similar to one another in structure, components, and function. The switching assemblies 110 are conductively coupled to the power source 104 via the power conductors 112, 114, 116, and are conductively coupled to the corresponding first and second loads 106, 108 via power conductors 120 (e.g., power conductors 120A-F). For example, conductor 120A may convey the first phase of alternating current to the first load 106, conductor 120B may convey the second phase of alternating current to the first load 106, and conductor 120C may convey the third phase of alternating current to the first load 106. Similarly, conductor 120D may convey the first phase of alternating current to the second load 108, conductor 120E may convey the second phase of alternating current to the second load 108, and conductor 120F may convey the third phase of alternating current to the second load 108.

The first switching assembly 110A is configured to selectively allow the conduction of the multi-phase current from the power source 104 to the first load 106 and prevent the conduction of the current to the first load 106. The second switching assembly 110B is configured to selectively allow the conduction of the multi-phase current from the power source 104 to the second load 108 and prevent the conduction of the current to the second load 108. In one or more embodiments, the switching assemblies 110 include passive gate drive circuits and switching devices, as described in more detail below with reference to FIG. 2. For example, the switching assemblies 110 may include bi-directional switch cells 118 (shown in FIG. 2) having passive gate drive circuits and switching devices. The switching assemblies 110 are each composed of multiple sets of switch cells 118, and each set may control conduction of one of the phases of current from the power source 104 to the associated load 106, 108.

The switching system 102 further includes a switch controller 122 that is conductively coupled to the switching assemblies 110 to provide control signals to the switching assemblies 110. For example, the switch controller 122 is conductively coupled to the first switching assembly 110A via a first pair 124 of signal conductors 126 and is conductively coupled to the second switching assembly 110B via a second pair 128 of signal conductors 126. Each pair 124, 128 of signal conductors 126 may represent two conductors within a single cable (e.g., a coaxial cable or a twin-axial cable) or two different insulated wires or cables. The signal conductors 126 may be configured to carry low currents, on the order of a few Amps. The switch controller 122 is disposed at the surface 109, and the signal conductors 126 extend underground to the switching assemblies 110 located in the downhole environment. Optionally, the signal conductors 126 may be packaged with the power conductors 112, 114, 116 within a common cable jacket. Although four total signal conductors 126 are shown in FIG. 1, in another embodiment two of the conductors 126 used for ground or return lines may be shared, such that only three total signal conductors 126 are used to provide control signals to the two switching assemblies 110A, 110B.

The switch controller 122 may represent hardware circuitry that includes and/or is connected with one or more processors (e.g., microprocessors, field programmable gate arrays, integrated circuits, or other electronic logic-based devices) and/or input devices (e.g., buttons, switches, keyboards, etc.) that generate control signals for the switching assemblies 110, control various switches (e.g., a mechanical switch 2506 shown in FIG. 6), and the like.

The switching system 102 also includes first and second transformers 130A, 130B. The first transformer 130A is conductively coupled to the switch controller 122 via the first pair 124 of signal conductors 126, and the second transformer 130B is conductively coupled to the switch controller 122 via the second pair 128 of signal conductors 126. The first and second transformers 130A, 130B may have identical or at least similar structure, components, and function. For example, as shown and described with reference to FIGS. 2 and 3, the transformers 130 each have a primary winding that is conductively coupled to the signal conductors 126 and multiple secondary windings conductively coupled to the different sets of switch cells 118 (shown in FIG. 2) in the corresponding switching assemblies 110A, 110B. The control signals generated and transmitted by the switch controller 122 are conveyed by the corresponding transformer 130 to the intended switching assembly 110 to control the switching assembly 110. For example, a control signal transmitted along the first pair 124 of signal conductors 126 is conveyed by the first transformer 130A to the sets of switch cells 118 of the first switching assembly 110A, and a control signal transmitted along the second pair 128 of signal conductors 126 is conveyed by the second transformer 130B to the switch cells 118 of the second switching assembly 110B.

The switching system 102 is configured to control the supply of the multi-phase current from the power source 104 to the loads 106, 108. For example, to supply multi-phase current to the first load 106, the switch controller 122 may generate and transmit an activation control signal along the first pair 124 of signal conductors 126 to the first switching assembly 110A via the first transformer 130A. Responsive to receiving the activation control signal, the first switching assembly 110A is configured to activate and allow the multi-phase current to conduct from the power conductors 112, 114, 116 through the switching assembly 110A and the power conductors 120A-C to the first load 106. The switch controller 122 may transmit the activation control signal repeatedly or periodically to maintain the conduction of multi-phase current to the load 106. While the switch controller 122 transmits the activation control signal to the first switching assembly 110A, the switch controller 122 does not transmit the activation control signal to the second switching assembly 110B. For example, the switch controller 122 may send no control signal to the second switching assembly 110B. In order to switch from the first load 106 to the second load 108 (e.g., to use a back-up motor in a subterranean pump), the switch controller 122 may generate a deactivation control signal that is transmitted to the first switching assembly 110A (via the first pair 124 and the first transformer 130A). The deactivation control signal is configured to deactivate the first switching assembly 110A to stop conduction of the multiple phases of current to the first load 106. The switch controller 122 also transmits the activation control signal to the second switching assembly 110B via the second pair 128 of signal conductors 126 and the second transformer 130B. The receipt of the activation control signal activates the second switching assembly 110B to allow conduction of the multi-phase current to the second load 108 along the power conductors 112, 114, 116 and the power conductors 120D-F.

In the illustrated embodiment, the switch controller 122 is configured to control the first and second switching assemblies 110A, 110B such that only one of the switching assemblies 110A, 110B is activated during a given time period such that only one of the loads 106, 108 receives the multi-phase current. For example, the second load 108 may be a back-up motor to the first load 106, so there is no need to operate both loads 106, 108 at the same time. In an alternative embodiment, the switch controller 122 may be configured to activate both switching assemblies 110A, 110B during a common time period such that both loads 106, 108 are supplied current. Typically only one of the loads 106, 108 is running and the other one acts as a backup, although there may be instances when both loads 106, 108 are supplied current during a common time period, such as to provide additional power or work.

Figure 2:
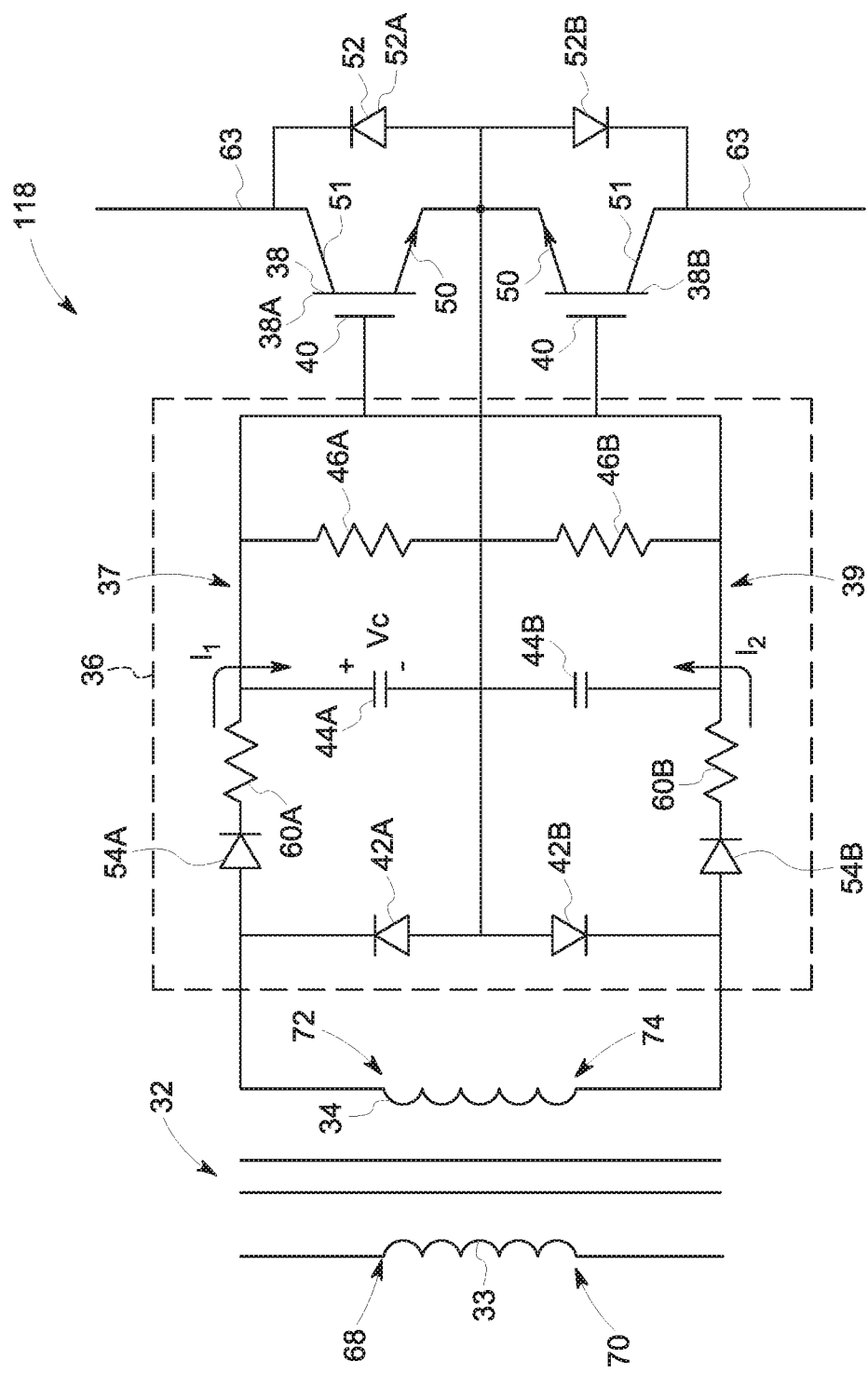
FIG. 2 illustrates a switch cell in accordance with various embodiments.

FIG. 2 illustrates a switch cell 118 in accordance with various embodiments. The switch cell 118 may comprise a portion of the first switching assembly 110A and/or the second switching assembly 110B (shown in FIG. 1). The switch cell illustrates a passive gate drive circuit arrangement. The switch cell 118 is configured to receive a control signal from a transformer 32 having a primary winding 33 and a secondary winding 34. The transformer 32 may be the first transformer 130A or the second transformer 130B (shown in FIG. 1). The switch cell 118 includes a gate drive circuit 36 that controls the voltage to a pair of solid state switching devices 38. The switching devices 38 of the switch cell 118 can alternate between closed (e.g., conducting) and open (e.g., non-conducting) states to control the conduction of current between the power source 104 (shown in FIG. 1) and one of the loads 106, 108 (FIG. 1). For example, each switch cell 118 can operate as a switch to cut off conduction or conduct electric current through the switch cell 118. The switching devices 38 of the switch cells 118 are controlled to be open or closed based on received control signals from the transformer 32 (e.g., originally generated by the switch controller 122 shown in FIG. 1). The control signals are conducted through the gate drive circuit 36, which may convert the electrical energy in the control signals to gate drive signals applied to one or more of the switching devices 38.

The switching devices 38 may be solid state devices that can withstand and continue to operate under high temperature and/or high pressure conditions (e.g., temperatures of at least 150 to 200 degrees Celsius and/or pressures of at least 130,000 kilopascals). The switching devices 38 are Insulated Gate Bipolar Transistors (IGBTs) in the illustrated embodiment. However, the switching devices 38 may be Metal Oxide Semiconductor Field Effect Transistors (MOSFETs), or different types of Transistors such as Junction Field Effect Transistors (JFETs), Reverse Blocking IGBTs, or the like. Additionally, it should be noted that the switching devices 38 may be based on Silicon (Si), Silicon Carbide (SiC), Gallium Nitride (GaN), or any other material suitable to build controllable solid state switching devices. The gate drive circuit 36 applies gate drive signals to gates 40 of the switching devices 38.

The gate drive circuit 36 includes an upper set 37 of passive components and a lower set 39 of passive components. The upper set 37 may mirror the lower set 39. The upper set 37 is conductively coupled to a first or upper solid state switching device 38A, and the lower set 39 is conductively coupled to a second or lower solid state switching device 38B. As used herein, the terms "upper," "lower," "first," "second," and the like are only used to distinguish the referenced elements and do not necessarily require particular positions or orientations relative to the surrounding environment.

The gate drive circuit 36 includes a pair of diodes 42A, 42B connected in parallel with a pair of gate capacitors 44A, 44B. The gate drive circuit 36 also includes a pair of diodes 54A, 54B connected in series with a pair of resistors 60A, 60B and disposed between the diodes 42A, 42B and the gate capacitors 44A, 44B. The resistors 60A, 60B function as filtering elements and optionally may be omitted from the gate drive circuit 36 in one or more embodiments. The gate capacitors 44A, 44B are connected in parallel with a pair of resistors 46A, 46B. The diodes 42A, 54A, the resistors 60A, 46A, and the capacitor 44A are included within the upper set 37 of components, and the diodes 42B, 54B, the resistors 60B, 46B, and the capacitor 44B are included within the lower set 39. The two diodes 42A, 42B are connected in opposite directions, such that anodes of the two diodes 42A, 42B are connected to each other and cathodes of the two diodes 42A, 42B face in opposite directions. The orientation of the diodes 42A, 42B is configured to restrict conduction of current to opposite directions. The cathode of the diode 42A is connected to the anode of the diode 54A, and the cathode of the diode 42B is connected to the anode of the diode 54B.

The upper set 37 and the lower set 39 are connected in parallel across the secondary winding 34 of the transformer 32. The components in the upper set 37 are connected to the components in the lower set 39 across the gates 40 and emitters 50 of the upper and lower switching devices 38A, 38B. For example, the upper set 37 of components are connected across the gate 40 and the emitter 50 of the upper switching device 38A, and the lower set 39 of components are connected across the gate 40 and the emitter 50 of the lower switching device 38B.

The upper and lower switching devices 38A, 38B each include a diode 52 (e.g., diodes 52A, 52B) connected between the emitter 50 and a drain 63 of the respective switching device 38A, 38B. In the illustrated embodiment, the switching devices 38A, 38B are connected in a common emitter configuration. The two diodes 52A, 52B are conductively coupled in opposite directions, such that anodes of the two diodes 52A, 52B are connected to each other and cathodes of the two diodes 52A, 52B face in opposite directions. The cathode of the diode 52A of the upper switching device 38A optionally may be connected to one of the power conductors 112, 114, 116 shown in FIG. 1, and the cathode of the diode 52B of the lower switching device 52B may be connected to one of the power conductors 120A-C shown in FIG. 1. The orientation of the diodes 52A, 52B is configured to restrict conduction of current to opposite directions. For example, the diodes 52A, 52B are configured to allow conduction of current through the diodes 52A, 52B from the respective anodes to the respective cathodes, and are configured to block current flowing in a direction from the respective cathodes to the respective anodes. For example, the diode 52A only allows current conduction in one direction (e.g., direction 312 shown in FIG. 9), and the diode 52B only allows current conduction in an opposite direction (e.g., direction 310 shown in FIG. 8).

Figure 3:
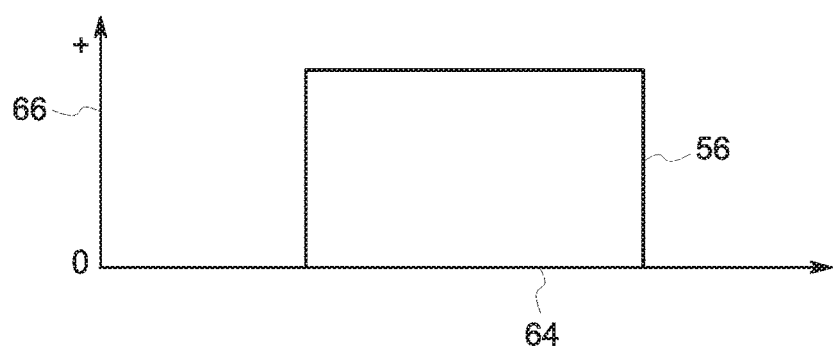
FIG. 3 illustrates one example of a positive pulse voltage.

In operation, a control signal may be conveyed to the switch cell 118 by the transformer 32. For example, the switch controller 122 (shown in FIG. 1) may transmit the control signal to the primary winding 33, which induces the control signal in the secondary winding 34 that is conductively coupled to the switch cell 118. The control signal may include a positive pulse voltage. FIG. 3 illustrates one example of a positive pulse voltage 56. The positive pulse voltage 56 is shown alongside a horizontal axis 64 representative of time and a vertical axis 66 representative of magnitude of positive voltage. A control signal that includes only positive pulse voltages 56 may be referred to as a unipolar positive control signal.

The positive pulse voltage can cause a positive potential to be applied at or near one end 68 of the primary winding 33 and a negative potential to be applied at or near an opposite end 70 of the primary winding 33. The transformer 32 transfers these potentials to the secondary winding 34 such that a first end 72 of the secondary winding 34 has a positive potential and an opposite second end 74 of the secondary winding 34 has a negative potential.

With respect to the gate drive circuit 36, the positive pulse voltage is conducted as a current $I_1$ through the diode 54A and the resistor 60A (if provided) to the gate capacitor 44A to charge the gate capacitor 44A. The current is conducted from the capacitor 44A through the diode 42B back to the secondary winding 34 of the transformer 32. The current $I_1$ charges the capacitor 44A to a voltage (Vc), which may be referred to as a charged state, and does not charge the gate capacitor 44B. The charging of the capacitor 44A results in a drive signal at the gate 40 of the switching device 38A, which turns ON (e.g., closes) the switching device 38A when the charge of the capacitor 44A exceeds a threshold activation voltage of the gate 40. The activation voltage may be fifteen volts (V) in one embodiment; however, the activation voltage may be greater or less than 15 V in other embodiments. The closing of the switching device 38A allows current to flow through the switching device 38A. For example, current is allowed to flow through the emitter 50 and a collector 51 of the switching device 38A.

The switching device 38A may be maintained in an ON state by sending a train of positive pulse voltage to maintain the charge of the capacitor 44A above the threshold activation voltage. The controller 122 can stop transmitting the positive pulse voltage to the transformer 32 to open the switching device 38A. Once the train of pulses is stopped, the energy stored in the capacitor 44A is conducted out of the capacitor 44A as a discharge current through the resistor 46A to dissipate the stored energy. Responsive to the voltage charge of the capacitor 44A falling below the threshold activation voltage of the gate 40, the switching device 38A turns off (e.g., opens), blocking current flow through the switching device 38A (e.g., through the collector 51 and emitter 50 of the switching device 38A).

Figure 4:
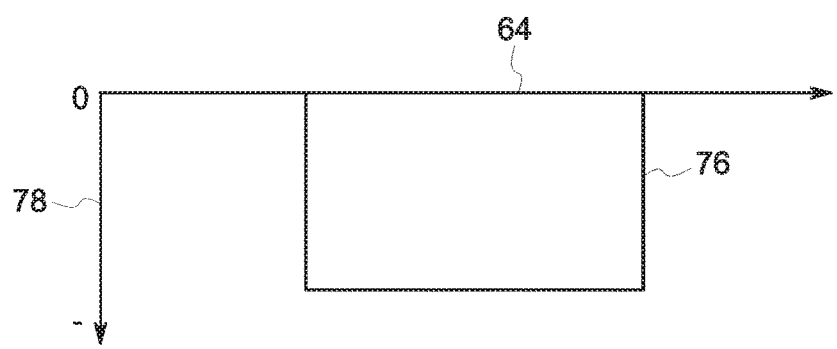
FIG. 4 illustrates one example of a negative pulse voltage.

Furthermore, the same or a different control signal conveyed by the transformer 32 may include a negative pulse voltage in order to turn ON (e.g., close) the switching device 38B. FIG. 4 illustrates one example of a negative pulse voltage 76. The negative pulse voltage 76 is shown alongside the horizontal axis 1702 and a vertical axis 78 representative of magnitude of negative voltage. A control signal that includes only negative pulse voltages 76 may be referred to as a unipolar negative control signal. The negative pulse voltage can cause a negative potential to be applied at or near the end 68 of the primary winding 33 and a positive potential to be applied at or near the opposite end 70 of the primary winding 33. The transformer 32 transfers these potentials to the secondary winding 34 such that the first end 72 of the secondary winding 34 has a negative potential and the opposite second end 74 of the secondary winding 34 has a positive potential.

With respect to the gate drive circuit 36, the negative pulse voltage is conducted as a current $I_2$ through the diode 54B and the resistor 60B (if provided) to the gate capacitor 44B to charge the capacitor 44B. The current is conducted from the capacitor 44B through the diode 42A back to the secondary winding 34 of the transformer 32. The current $I_2$ charges the capacitor 44B, without charging the gate capacitor 44A. The charging of the capacitor 44B results in a drive signal at the gate 40 of the switching device 38B that turns ON (e.g., closes) the switching device 38B when the charge of the capacitor 44B exceeds a threshold activation voltage of the gate 40. The closing of the switching device 38B allows current to flow through the switching device 38B, such as through the emitter 50 and a collector 51 of the switching device 38B. The switching device 38B may be maintained in an ON state by sending a train of negative pulse voltages to maintain the charge of the capacitor 44B above the threshold activation voltage. The controller 122 can stop transmitting the negative pulse voltage to the transformer 32 to open the switching device 38B. Once the train of pulses is stopped, the electrical energy stored in the capacitor 44B is conducted out of the capacitor 44B as a discharge current through the resistor 46B to dissipate the stored energy. Responsive to the voltage charge of the capacitor 44B falling below the threshold activation voltage of the gate 40, the switching device 38B turns off (e.g., opens), blocking current flow through the switching device 38B.

As described above, a control signal having a positive pulse voltage closes the upper switching device 38A, and a control signal having a negative pulse voltage closes the lower switching device 38B. In one or more embodiments, a control signal conveyed to the switch cell 118 by the transformer 32 may be an alternating pulse voltage having both a positive pulse voltage and a negative pulse voltage in order to close both switching devices 38A, 38B. When both switching devices 38A, 38B are closed (e.g., turned ON), the switch cell 118 is activated because current is allowed to flow through the switching devices 38A, 38B from the drain 63 of the upper switching device 38A to the drain 63 of the lower switching device 38B or vice-versa. A first conductor may be electrically connected to the drain 63 of the upper switching device 38A, and a second conductor may be electrically connected to the drain 63 of the lower switching device 38B. For example, with reference to FIG. 1, the power conductor 112 configured to convey the first phase of electric current supplied from the power source 104 may be the first conductor connected to the drain 63 of the upper switching device 38A. The second conductor connected to the drain 63 of the lower switching device 38B may be the power conductor 120A that conveys the first phase of the current to the first load 106. Therefore, when the switch cell 118 is activated and the switching devices 38A, 38B are closed, current is conducted through the switch cell 118 from the power conductor 112 to the power conductor 120A and eventually to the first load 106. The switch cell 118 in an embodiment is bi-directional such that current can flow across the two switching devices 38A, 38B in either direction (e.g., from the drain 63 of the upper switching device 38A to the drain 63 of the lower switching device 38B or vice-versa). Therefore, a current of the opposite polarity may flow from the power conductor 120A across the switch cell 118 to the power conductor 112.

Figure 5:
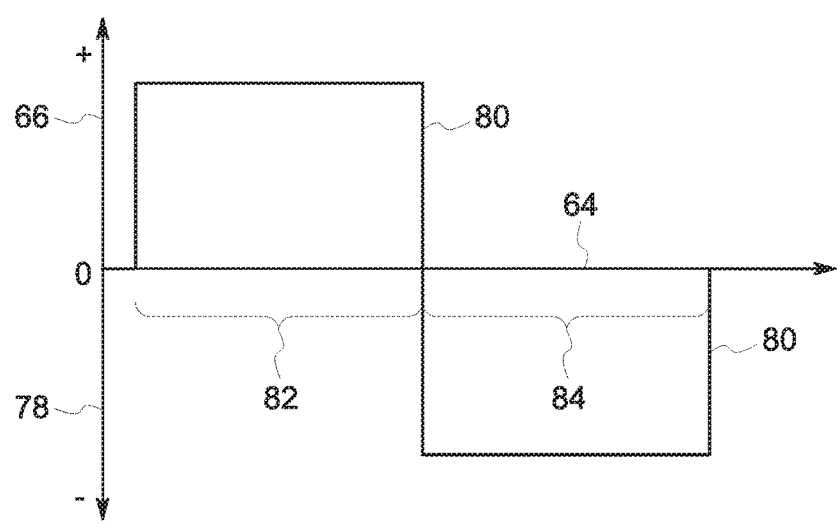
FIG. 5 illustrates one example of an alternating pulse voltage.

Reference is additionally made to FIG. 5, which illustrates one example of an alternating pulse voltage 80. The alternating pulse voltage 80 is shown alongside the horizontal axis 64 and the vertical axes 66, 78 shown in FIGS. 3 and 4, respectively. The alternating pulse voltage may cause a positive potential to be applied at or near the end 68 of the primary winding 33 and a negative potential to be applied at or near the opposite end 70 of the primary winding 33 during a first time period 82 in which the alternating pulse voltage 80 includes a positive pulse voltage (similar to the positive pulse voltage 56 shown in FIG. 3). As described above, the positive pulse voltage applied during the first time period 82 may close the switching device 38A. During a different, second time period 84 in which the alternating pulse voltage 80 includes a negative pulse voltage (similar to the negative pulse voltage 76 shown in FIG. 4), the alternating pulse voltage 80 may cause a negative potential to be applied at or near the end 68 of the primary winding 33 and a positive potential to be applied at or near the opposite end 70 of the primary winding 33. As described above, the negative pulse voltage applied during the second time period 84 may close the switching device 38B. The time periods 82, 84 may be sufficiently short in duration (e.g., sufficiently high in frequency) such that the gate capacitors 44A, 44B in the gate drive circuit 36 maintain charges above the activation thresholds of the switching devices 38A, 38B to maintain the switching devices 38A, 38B in the closed or ON state. The alternating pulse voltage 80 may be a square wave. Since the alternating pulse voltage 80 has a positive polarity during the first time period 82 and a negative polarity during the second time period 84, the alternating pulse voltage 80 is a bipolar control signal. A control signal that includes the alternating pulse voltage 80 may be referred to as an activation control signal because the switch cell 118 that receives the alternating pulse voltage 80 is activated to conduct current through the switching devices 38A, 38B of the switch cell 118. Upon removal of the alternating pulse voltage 80, the gate capacitors 44A, 44B can discharge through the resistors 46A, 46B, causing the switching devices 38A, 38B to open (e.g., turn OFF).

Figure 6:
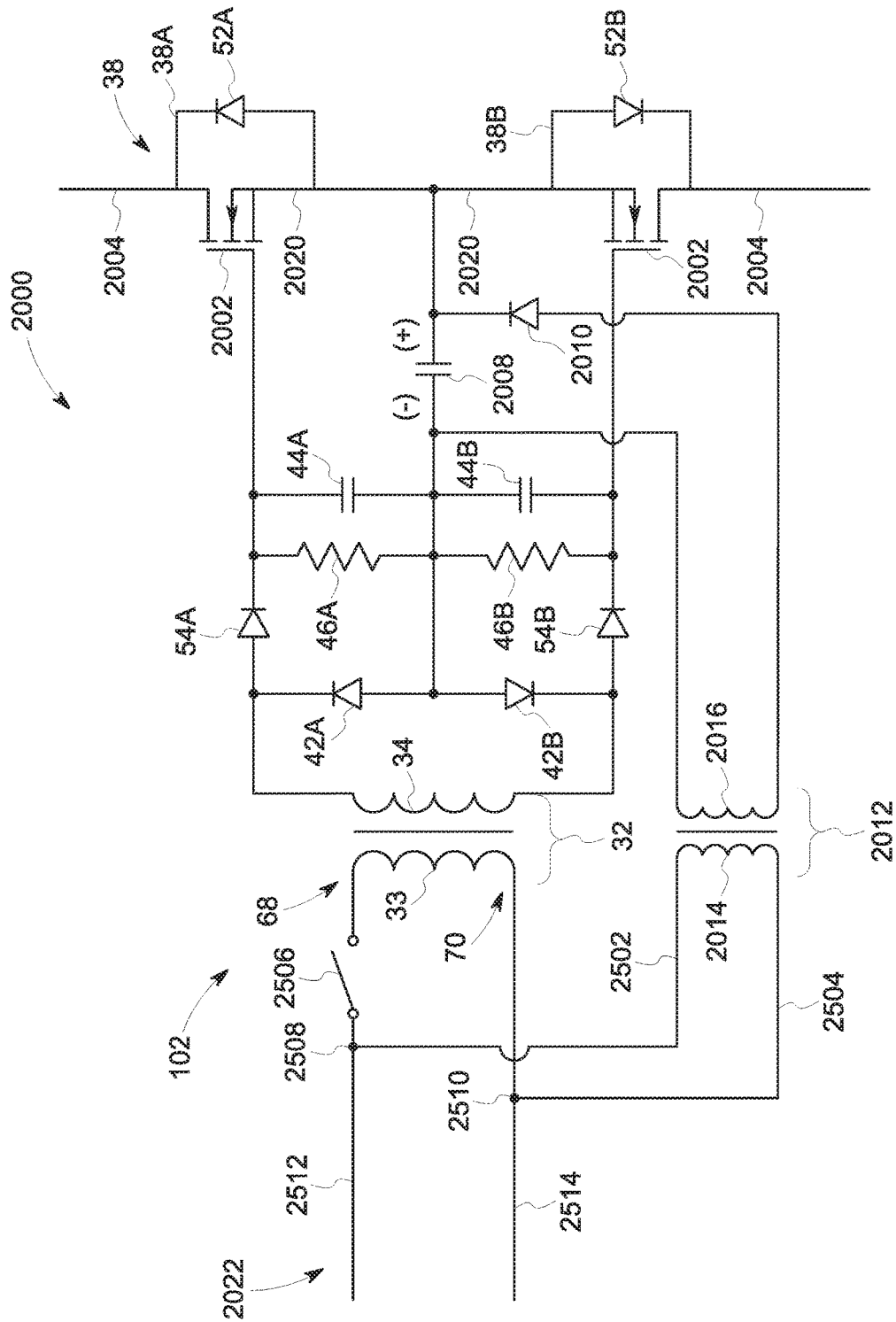
FIG. 6 illustrates a switch cell of the switching system according to an alternative embodiment.

FIG. 6 illustrates a switch cell 2000 of the switching system 102 according to an alternative embodiment. The switch cell 2000 may be used in place of the switch cell 118 shown in FIG. 2. For example, the switching assemblies 110A, 110B shown in FIG. 1 may each include multiple switch cells 2000 in place of one or more of the switch cells 118. The switch cell 2000 includes many of the same components as the switch cell 118 and may operate in a similar manner. For example, a positive pulse voltage may be applied to the transformer 32 by the controller 122 (shown in FIG. 1) to charge the capacitor 44A and close the switching device 38A, a negative pulse voltage may be applied to the transformer 32 to charge the capacitor 44B and close the switching device 38B, and an alternating pulse voltage may be applied to close both switching devices 38A, 38B. In the illustrated embodiment, the switching devices 38 in the switch cell 2000 are MOSFETs and include gates 2002, sources 2020, and drains 2004. Alternatively, the switching devices 38 may be the IGBTs shown in FIG. 2.

The switch cell 2000 includes a transformer 2012 (referred to herein as a bias transformer) that has a primary winding 2014 and a secondary winding 2016. The secondary winding 2016 is connected with a diode 2010 in series with a capacitor 2008 (referred to herein as a bias capacitor or a negative bias capacitor). The bias capacitor 2008 is connected with the gate capacitors 44A, 44B and the switching devices 38A, 38B between the gate capacitors 44A, 44B and between the switching devices 38A, 38B. The bias capacitor 2008 is configured to apply a negative voltage bias to the gate 2002 of at least one of the switching devices 38A, 38B in the switch cell 2000 to prevent noise or other electrical interference in the circuitry (e.g., electric energy other than voltages or currents conducted from the power source 104 or the switch controller 122) from causing the switching devices 38A to close or turn ON. For example, without the bias capacitor 2008, in the absence of a sufficient pulse voltage being applied by the switch controller 122, electrical noise or interference in the switch cell 2000 could potentially charge the capacitor 44A by an amount that is sufficient to meet or exceed the activation voltage of the switching device 38A, closing the switching device 38A.

To prevent electrical noise or interference from activating the switch cell 2000, the bias transformer 2012 is configured to receive a pulse voltage (e.g., an alternating pulse voltage, such as the pulse voltage 80 shown in FIG. 5) from the switch controller 122 (or another signal transmitting device). For example, the primary winding 2014 of the bias transformer 2012 may be conductively coupled with the switch controller 122 via a pair of signal conductors. The pulse voltage applied to the primary winding 2014 can be transferred to the secondary winding 2016 and then conducted through the diode 2010 to the bias capacitor 2008. The cathode of the diode 2010 is connected in series with the bias capacitor 2008, so the capacitor 2008 is charged by a voltage that has a positive polarity on the side of the capacitor 2008 coupled with the cathode of the diode 2010 and a negative polarity on the opposite side of the capacitor 2008.

The negative polarity of the energy stored in the bias capacitor 2008 may be applied to the gate 2002 of the switching device 38A. The magnitude of the negative polarity of the energy applied to the gate 2002 of the switching device 38A is based on the magnitude of the pulse voltage applied to the bias transformer 2012 (e.g., a larger voltage increases the negative polarity applied to the gate 2002). The negative polarity applied to the gate 2002 of the switching device 38A effectively increases the activation voltage threshold of the switching device 38A, increasing the amount of positive voltage that needs to be applied to the gate 2002 to activate the switching device 38A. For example, if a pre-configured activation voltage threshold of the switching device 38A is +15 volts and the bias capacitor 2008 causes −5 volts to be applied to the gate 2002, then the gate capacitor 44A needs to be charged to at least +20 volts such that at least +20 volts is applied to the gate 2002 to close the switching device 38A. The bias capacitor 2008 therefore increases the activation voltage threshold of the switching device 38A from +15 volts to +20 volts. By applying the negative bias to the gate 2002 to increase the amount of positive voltage needed to activate the switching device 38A, the bias capacitor 2008 can reduce or eliminate instances where electrical noise or other interference activates the switching device 38A. Although the preceding description is directed to the switching device 38A, it is recognized that the switching device 38B may interact with the bias capacitor 2008 or another bias capacitor (e.g., a bias capacitor that applies a positive polarity voltage to the gate 2002 of the switching device 38B) in a similar manner as the bias capacitor 2008 interacts with the switching device 38A.

The transformer 32 of the switching system 102 is conductively coupled to a switch controller (e.g., the switch controller 122 shown in FIG. 1) via a pair 2022 of signal conductors 2512, 2514. The signal conductors 2512, 2514 may be the signal conductors 126 in the pair 124 shown in FIG. 1. The transformer 32 receives control signals from the switch controller via the pair 2022 of signal conductors 2512, 2514, which optionally may be contained within a single cable. In the illustrated embodiment, the switching system 102 includes signal conductors 2502, 2504 that conductively couple the bias transformer 2012 to the signal conductors 2512, 2514, respectively. The signal conductor 2502 is conductively coupled to the signal conductor 2512 at a node 2508, and the signal conductor 2504 is conductively coupled to the signal conductor 2514 at a node 2510. The locations of the nodes 2508, 2510 may be more proximate to the primary winding 33 and the switch cell 2000 than the switch controller in order to reduce the total length of signal conductors used in the switching system 102. For example, the length of the signal conductors 2512, 2514 between the nodes 2508, 2510 and the primary winding 33 may be less than 1 meter, such as less than 0.1 m, while the length of the signal conductors 2512, 2514 between the nodes 2508, 2510 and the switch controller may be greater than 10 meters, such as greater than 100 meter or 1000 meters. In a downhole environment, the switch controller and power source may be located at or near the surface; the transformers 32, 2012, the switch cell 2000, and the signal conductors 2502, 2504 may be located underground at a subterranean pump; and the signal conductors 2512, 2514 and power conductors extend from the surface to the downhole location of the pump. By connecting the signal conductors 2512, 2514 and the signal conductors 2502, 2504 proximate to the switch cell 2000, only two conductive pathways are used to extend the majority of the distance between the switch controller and the transformers 32, 2012, instead of four conductive pathways. Although the transformers 32, 2012 effectively share two signal conductors between the switch controller and the nodes 2508, 2510 in the illustrated embodiment, in an alternative embodiment, the transformers 32, 2012 may only share one signal conductor such that three signal conductors extend from the switch controller towards the transformers 32, 2012.

In the illustrated embodiment, a switch 2506 is conductively coupled with and disposed between the node 2508 and the primary winding 33 of the transformer 32. Alternatively, the switch 2506 may be disposed between the node 2510 and the primary winding 33 of the transformer 32. The switch 2506 can represent a mechanical switch or a solid state switch that opens or closes to control conduction of voltage or current to the transformer 32. The switch 2506 can be controlled by a switch controller (e.g., the switch controller 122 shown in FIG. 1). For example, when the switch 2506 is closed, control signals transmitted by the switch controller are received by the transformer 32 and used to control the activation or deactivation of the switch cell 2000. However, when the switch 2506 is open, the control signals transmitted by the switch controller bypass the transformer 32 and the switch cell 2000. Therefore, when the switch 2506 is closed, the switch cell 2000 can be activated upon receipt of an activation control signal, but when the switch 2506 is open, the switch cell 2000 is deactivated and cannot be activated. When the switch 2506 is open, the electrical energy transmitted by the switch controller is directed to the bias transformer 2012 and conveyed to the bias capacitor 2008 for applying a bias voltage to at least one of the switching devices 38A, 38B to reduce or eliminate instances where electrical noise or other interference activates the switch cell 2000.

Figure 7:
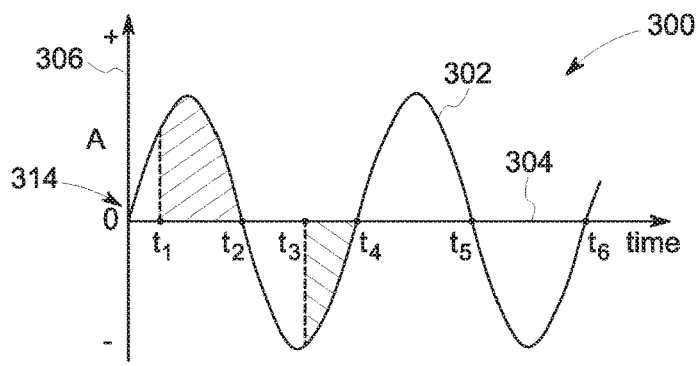
FIG. 7 is a graph plotting a current waveform according to an embodiment.
Figure 8:
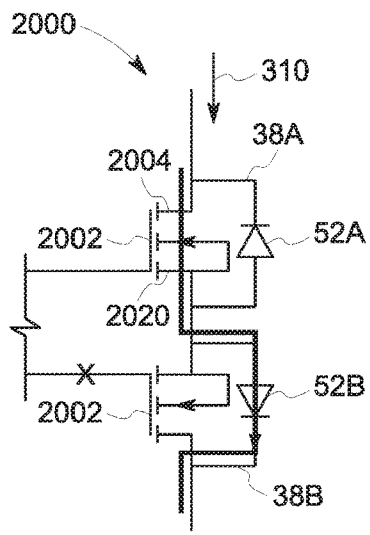
FIG. 8 is a schematic diagram showing switching devices of the switch cell of FIG. 6 during a turn-off process at a first time period.
Figure 9:
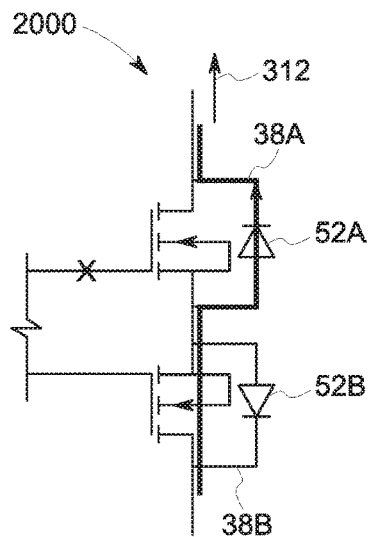
FIG. 9 is a schematic diagram showing the switching devices of the switch cell of FIG. 6 during the turn-off process at a different, second time period.

FIGS. 7-9 illustrate a turn-off process for deactivating a switch cell (e.g., the switch cell 2000 shown in FIG. 6 or the switch cell 118 shown in FIG. 2) according to an embodiment. FIG. 7 is a graph 300 plotting a current waveform 302 according to an embodiment along a horizontal axis 304 representative of time and a vertical axis 306 representative of magnitude of current (in Amps) in both positive and negative directions or polarities. For example, the current waveform 302 may represent one of the multiple phases of current that is supplied by the power source 104 (shown in FIG. 1) to at least one of the loads 106, 108 (FIG. 1). FIG. 8 is a schematic diagram showing the switching devices 38A, 38B of the switch cell 2000 during the turn-off process at a first time period. FIG. 9 is a schematic diagram showing the switching devices 38A, 38B of the switch cell 2000 during the turn-off process at a different, second time period.

As described above, both switching devices 38A, 38B are closed when the switch cell 2000 is activated to allow the switch cell 2000 to conduct current (e.g., current from the power source 104) through the switching devices 38A, 38B. The switch cell 2000 conducts bi-directional current. For example, current can flow in a first direction 310 through the upper switching device 38A before conducting through the lower switching device 38B, and in an opposite, second direction 312 through the lower switching device 38B before conducting through the upper switching device 38B. When the switch cell 2000 is activated, the current optionally may conduct in the first direction 310 (as shown in FIG. 8) when the polarity of the current waveform 302 shown in the graph 300 is positive, and the current conducts in the opposite direction 312 (as shown in FIG. 9) when the polarity of the current waveform 302 is negative. When the switch cell 2000 is activated and the current flows in the first direction 310, the current may be conducted along the source 2020 and drain 2004 of the upper switching device 38A since the diode 52A restricts conduction of current in the first current direction 310. The current may be conducted along the source 2020 and drain 2004 of the lower switching device 38B or along the diode 52B, which allows conduction of current in the first direction 310. When the switch cell 2000 is activated and the current flows in the second direction 312, the current is conducted along the source 2020 and drain 2004 of the lower switching device 38B and may be conducted through the diode 52A of the upper switching device 38A or through the source 2020 and drain 2004 of the upper switching device 38A.

In order to deactivate the switch cell 2000 from the activated state, opening the switching devices 38A, 38B at certain times may cause the current conducting through the switching devices 38A, 38B to damage the switch cell 2000. Damage to the switch cell 2000 can be avoided by allowing the diodes 52A, 52B of the switching devices 38A, 38B to cut off the flow of current through the switch cell 2000 when the current changes directions. The current changes directions when the polarity of the waveform 302 switches, which occurs when the waveform 302 crosses the zero line 314 in the vertical axis 306. The current when crossing the zero line 314 has low voltage, so deactivating the switch cell 2000 at such times reduces energy losses and risk of damage.

As shown in the graph 300, the current waveform 302 has a positive polarity from time 0 to time $t_2$. Therefore, the current flows in the first direction 310 through the activated switch cell 2000 as shown in FIG. 8. In order to deactivate the switch cell 2000 within the time period from time 0 to $t_2$, the lower switching device 38B is controlled to open (e.g., stop conducting) while the upper switching device 38A is controlled to remain closed (e.g., conducting). In the graph 300, the lower switching device 38B is opened at time $t_1$, but may be opened at any time between times 0 and $t_2$. In an embodiment, the lower switching device 38B is controlled to be opened while the upper switching device 38A is controlled to remain closed by the switch controller 122 shown in FIG. 1 transmitting a unipolar positive control signal that include the positive voltage pulse 56 shown in FIG. 3.

When the lower switching device 38B is open, the only conductive path through the switching device 38B is along the diode 52B. The diode 52B only conducts current in the first direction 310 (e.g., current with a positive polarity). At time $t_2$, when the current crosses the zero line 314 and changes direction (e.g., polarity), the diode 52B blocks conduction of the current in the second direction 312 through the lower switching device 38B, which stops current conduction through the switch cell 2000. At the time $t_2$, the switch cell 2000 does not conduct the current, so both switching devices 38A, 38B of the switch cell 2000 can be opened without risking damage to the switch cell 2000. For example, the switching devices 38A, 38B may be opened in response to the switch controller 122 (shown in FIG. 1) stopping the transmission of control signals to the switch cell 2000 and/or opening the switch 2506 shown in FIG. 6 to stop the flow of control signals to the switch cell 2000. The switch controller 122 may transmit the unipolar positive control signal between times $t_1$ and $t_2$.

As shown in the graph 300, the current waveform 302 has a negative polarity from time $t_2$ to time $t_4$. Therefore, the current flows in the second direction 312 through the activated switch cell 2000 as shown in FIG. 9. In order to deactivate the switch cell 2000 within the time period from time $t_2$ to $t_4$, the upper switching device 38A is controlled to open (e.g., stop conducting) while the lower switching device 38B is controlled to remain closed (e.g., conducting). In the graph 300, the upper switching device 38A is opened at time $t_3$, but may be opened at any time between times $t_2$ and $t_4$. In an embodiment, the upper switching device 38A is controlled to be opened while the lower switching device 38B is controlled to remain closed by the switch controller 122 shown in FIG. 1 transmitting a unipolar negative control signal that include the negative voltage pulse 76 shown in FIG. 4.

When the upper switching device 38A is open, the only conductive path through the switching device 38A is along the diode 52A, which only conducts current in the second direction 312. At time $t_4$, when the current crosses the zero line 314 and changes direction (e.g., polarity), the diode 52A blocks conduction of the current in the first direction 310 through the upper switching device 38A, which stops current conduction through the switch cell 2000. At the time $t_4$, the switch cell 2000 does not conduct the current, so both switching devices 38A, 38B of the switch cell 2000 can be opened without risking damage to the switch cell 2000. For example, the switching devices 38A, 38B may be opened in response to the switch controller 122 (shown in FIG. 1) stopping transmission of control signals to the switch cell 2000 and/or opening the switch 2506 shown in FIG. 6 to stop the flow of control signals to the switch cell 2000. The switch controller 122 may transmit the unipolar negative control signal between times $t_3$ and $t_4$.

Therefore, in one or more embodiments, the switch controller 122 is configured to deactivate the switch cell 2000 from an activated state by transmitting a unipolar control signal to the switch cell 2000 to open the upper switching device 38A or the lower switching device 38B. The switch controller 122 may determine whether to transmit a unipolar positive voltage pulse or a unipolar negative voltage pulse based on the polarity of the current waveform when the deactivation of the switch cell 2000 is desired. For example, as shown in FIG. 7, in response to the switch controller 122 receiving an input (e.g., a user input or a sensor input) to deactivate the switch cell 2000 between times 0 and $t_2$ or between times $t_4$ and $t_5$, the switch controller 122 transmits a unipolar positive voltage pulse to open the lower switching device 38B as shown in FIG. 8. Furthermore, in response to the switch controller 122 receiving the input to deactivate the switch cell 2000 between times $t_2$ and $t_4$ or between times $t_5$ and $t_6$, the switch controller 122 transmits a unipolar negative voltage pulse to open the upper switching device 38A as shown in FIG. 9.

Figure 10:
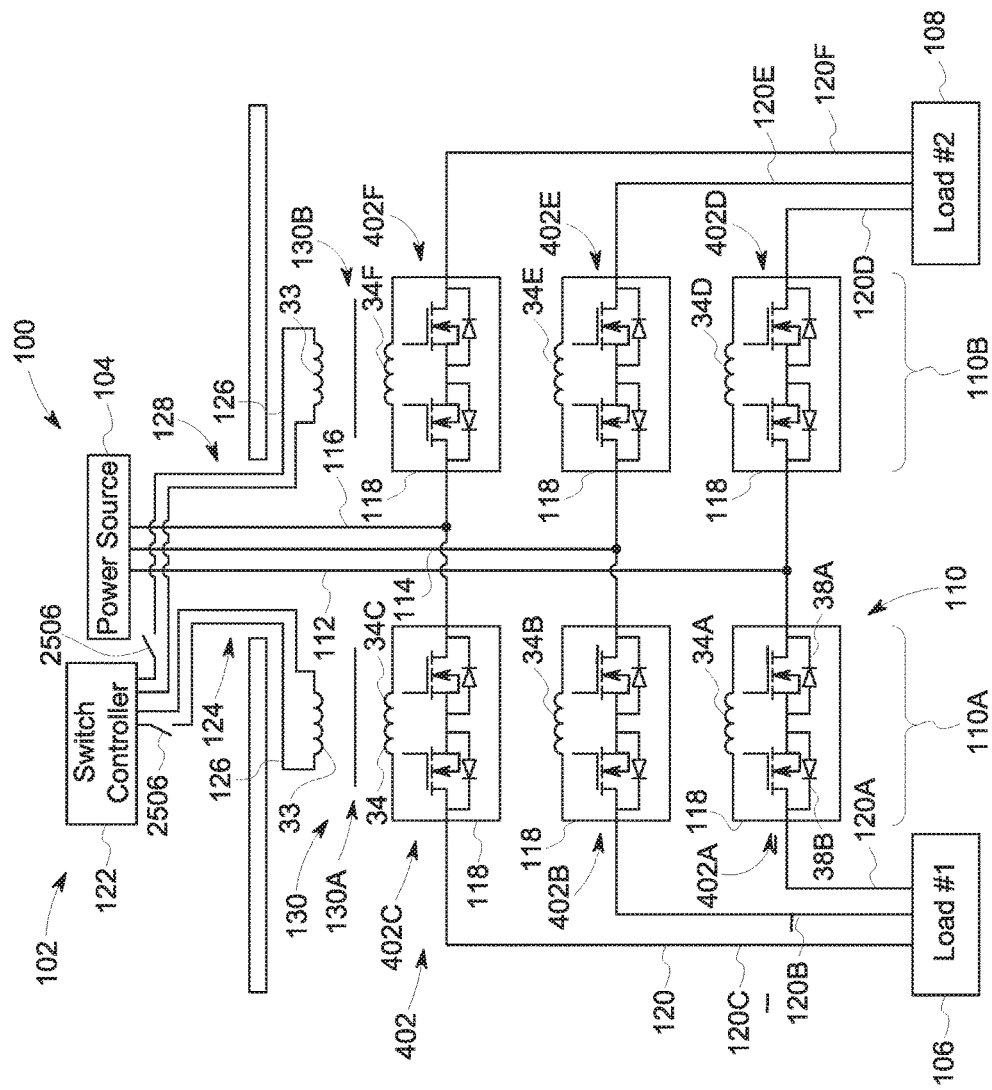
FIG. 10 illustrates the switching system and the power system of FIG. 1 according to an embodiment.

FIG. 10 illustrates the switching system 102 and the power system 100 of FIG. 1 according to an embodiment. The first and second switching assemblies 110A, 110B each includes multiple sets 402 of switch cells 118. In an alternative embodiment, at least some of the switch cells may be the switch cells 2000 shown in FIG. 6, or a combination of components from the switch cells 118 and the switch cells 2000. The sets 402 each include at least one switch cell 118. In the illustrated embodiment, each set 402 has a single switch cell 118, but at least some of the sets 402 may include more than one switch cell 118 in other embodiments. The switch cells 118 in the same and/or different sets 402 may be identical or at least similar to one another.

Each set 402 of switch cells 118 is conductively coupled to a different one of the power conductors 112, 114, 116. The sets 402 of switch cells 118 control the conduction of the different phases of the multi-phase current supplied from the power source 104 to the first and second loads 106, 108. In the illustrated embodiment, the power source 104 is configured to supply three-phase currents using the three power conductors 112, 114, 116 to supply the different phases of the current. Therefore, the first and second switching assemblies 110A, 110B each include three sets 402 of switch cells 118. For example, the first switching assembly 110A includes a first set 402A of switch cells 118 conductively coupled to the power conductor 112 and configured to control conduction of the first phase of current from the power source 104 to the first load 106; a second set 402B of switch cells 118 conductively coupled to the power conductor 114 and configured to control conduction of the second phase of current from the power source 104 to the first load 106; and a third set 402C of switch cells 118 conductively coupled to the power conductor 116 and configured to control conduction of the third phase of current from the power source 104 to the first load 106. The second switching assembly 110B also includes three sets 402 of switch cells 118 to control the conduction of the three phases of current to the second load 108. For example, the second switching assembly 100B includes a first set 402D of switch cells 118 conductively coupled to the conductor 112 that conveys the first phase of current, a second set 402E conductively coupled to the conductor 114 that conveys the second phase of current, and a third set 402F conductively coupled to the conductor 116 that conveys the third phase of current. The number of sets 402 of switch cells 118 in each switching assembly 110 corresponds to the number of phases of current (e.g., the number of power conductors 112, 114, 116) supplied by the power source 104, so the switching assemblies 110A, 110B may each have more or less than three sets 402 in other embodiments in which the power source 104 supplies greater or fewer than three phases of current.

Figure 11:
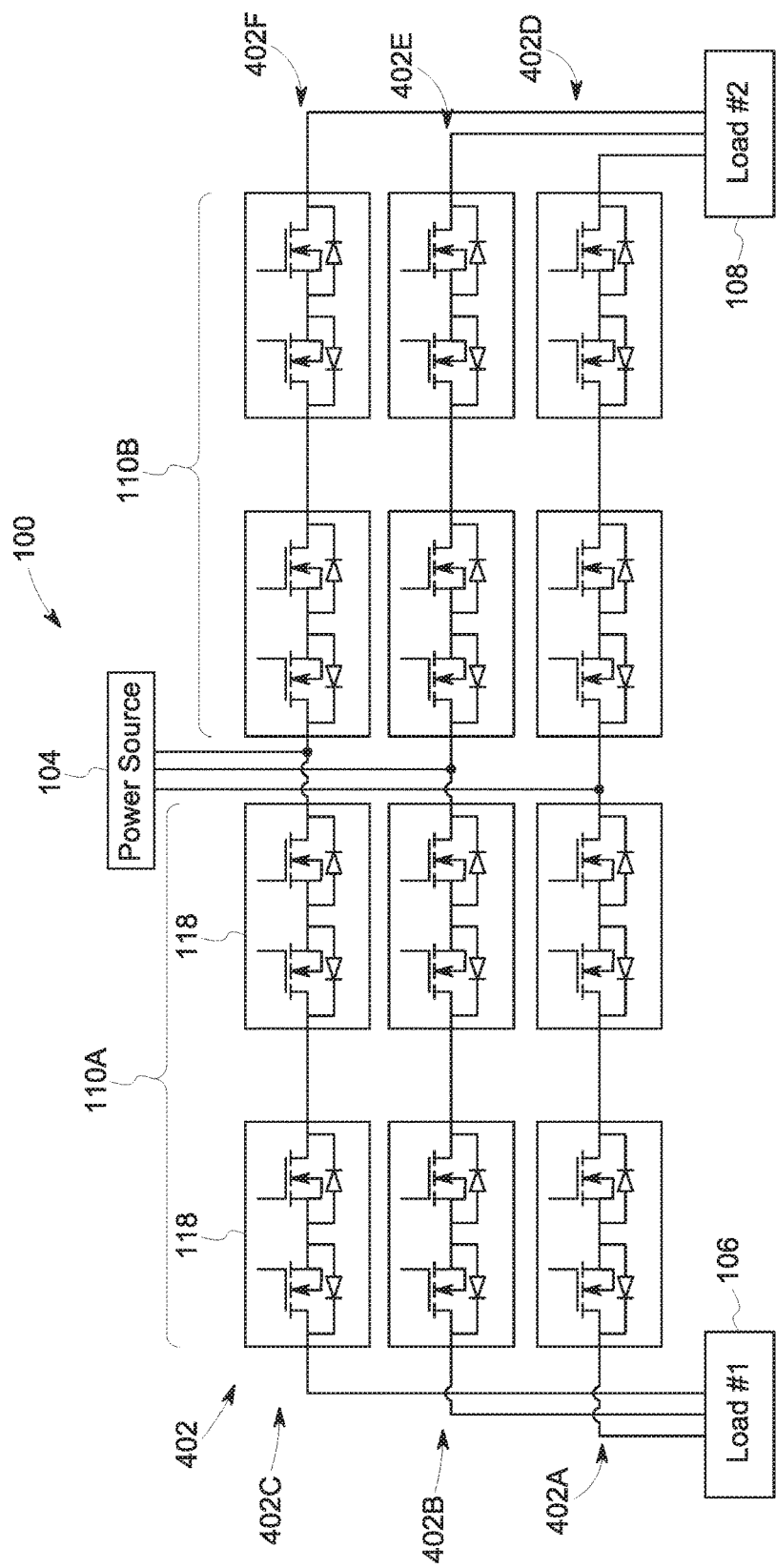
FIG. 11 illustrates the power system and switching assemblies of the switching system according to an alternative embodiment.

FIG. 11 illustrates the power system 100 and the switching assemblies 110A, 110B of the switching system 102 according to an alternative embodiment. In the illustrated embodiment, each of the sets 402 (e.g., sets 402A-F) of switch cells 118 of the first and second switching assemblies 110A, 110B includes two switch cells 118 conductively coupled to each other in series between the power source 104 and the corresponding first or second load 106, 108. By coupling at least two switch cells 118 in series in each set 402, the switching assemblies 110A, 110B may be configured to provide additional voltage to the loads 106, 108 for high voltage applications. In other embodiments, more than two switch cells 118 may be coupled in series in one or more of the sets 402.

Referring now back to FIG. 10, the sets 402 of switch cells 118 in the switching assemblies 110 are configured to conduct the corresponding phases of current to the corresponding loads 106, 108 by activating the switch cells 118 in the sets 402. For example, the first switching assembly 110A conducts the three-phase currents to the first load 106 in response to the switch cells 118 in the three sets 402A-C being activated. As described above, the switch cells 118 activate in response to both the upper and lower switching devices 38A, 38B of the switch cell 118 closing to allow current to conduct through the switch cell 118. The switch cells 118 are activated by receiving an activation control signal that includes both a positive voltage pulse and a negative voltage pulse. The sets 402 of switch cells 118 in the switching assemblies 110 are configured to stop conduction or prevent conduction of the corresponding phases of current to the corresponding loads 106, 108 by deactivating the switch cells 118 in the sets 402 or maintaining the switch cells 118 in a deactivated state. As described above with reference to FIGS. 7-9, the switch cells 118 may deactivate from an activated state by opening one of the upper or lower switching devices 38A, 38B such that the flow of current through the switch cell 118 ceases when the polarity of the current changes. The switch controller 122 may be configured to transmit a deactivation control signal to the switch cells 118 to cause one of the upper or lower switching devices 38A, 38B to open. The switch cells 118 may be maintained in the deactivated state by not receiving control signals, such that the energy in the capacitors 44A, 44B (shown in FIG. 2) dissipates and the switching devices 38A, 38B open. For example, the switch controller 122 may cease to transmit control signals to the switch cell 118 or the switch controller 122 may open the switch 2506 to break the conductive path to the switch cell 118.

The first transformer 130A has a primary winding 33 and multiple secondary windings 34 that are each inductively electrically connected to the primary winding 33. The secondary windings 34 are conductively coupled to the sets 402 of switch cells 118 of the first switching assembly 110A. For example, the transformer 130A includes a secondary winding 34A conductively coupled to the first set 402A of switch cells 118, a second winding 34B conductively coupled to the second set 402B, and a secondary winding 34C conductively coupled to the third set 402C. In an embodiment, the first transformer 130A is configured to receive control signals from the switch controller 122 at the primary winding 33 and convey the control signals to the sets 402A-C of switch cells 118 in the switching assembly 110A via the secondary windings 34A-C. Therefore, a single control signal transmitted by the switch controller 122 is conveyed via the transformer 130A to each of the sets 402 to control the conduction of all three phases of current to the first load 106. For example, a single activation control signal from the switch controller 122 causes the switch cells 118 in all three of the sets 402A-C to activate and conduct the three-phase current to the first load 106 along the power conductors 112, 114, 116 and 120A-C. Furthermore, a single deactivation control signal from the switch controller 122 causes the switch cells 118 in all three of the sets 402A-C to deactivate and stop conducting the three-phase current to the first load 106. The second transformer 130B may be identical or at least similar to the first transformer 130A, such that the second transformer 130B includes multiple secondary windings 34D, 34E, 34F conductively coupled to the sets 402D-F to allow a single activation control signal to activate the switch cells 118 in all three sets 402D-F and a single deactivation control signal to deactivate the switch cells 118 in all three sets 402D-F.

In operation, the switch controller 122 may supply three-phase current from the power source 104 to the first load 106 during a first time period by transmitting an activation control signal to the first transformer 130A along the pair 124 of signal conductors 126. The transformer 130A conveys the activation control signal to the sets 402A-C of switch cells 118, causing the switch cells 118 in all three sets 402A-C to activate and conduct the different phases of current to the first load 106. The switch controller 122 may switch the supply of current from supplying the first load 106 to supplying the second load 108 by deactivating the first switching assembly 110A and activating the second switching assembly 110B. For example, the switch controller 122 may transmit a deactivation control signal, having a unipolar positive or negative voltage pulse, to the first transformer 130A. At a time that the three phases of current switch polarity, the switch controller 122 may open the switch 2506 along the pair 124 of signal conductors 126 and/or may stop transmitting control signals to the first transformer 130A to stop the switch cells 118 in the sets 402A-C from conducting current to the first load 106. The switch controller 122 activates the second switching assembly 110B during a second time period by transmitting an activation control signal to the second transformer 130B along the pair 128 of signal conductors 126, which causes the switch cells 118 in all three sets 402D-F to activate and conduct the different phases of current to the second load 108. Although not described, it is also possible to activate both the first and second switching assemblies 110A, 110B concurrently by transmitting activating control signals to the first and second transformers 130A, 130B.

Figure 12:
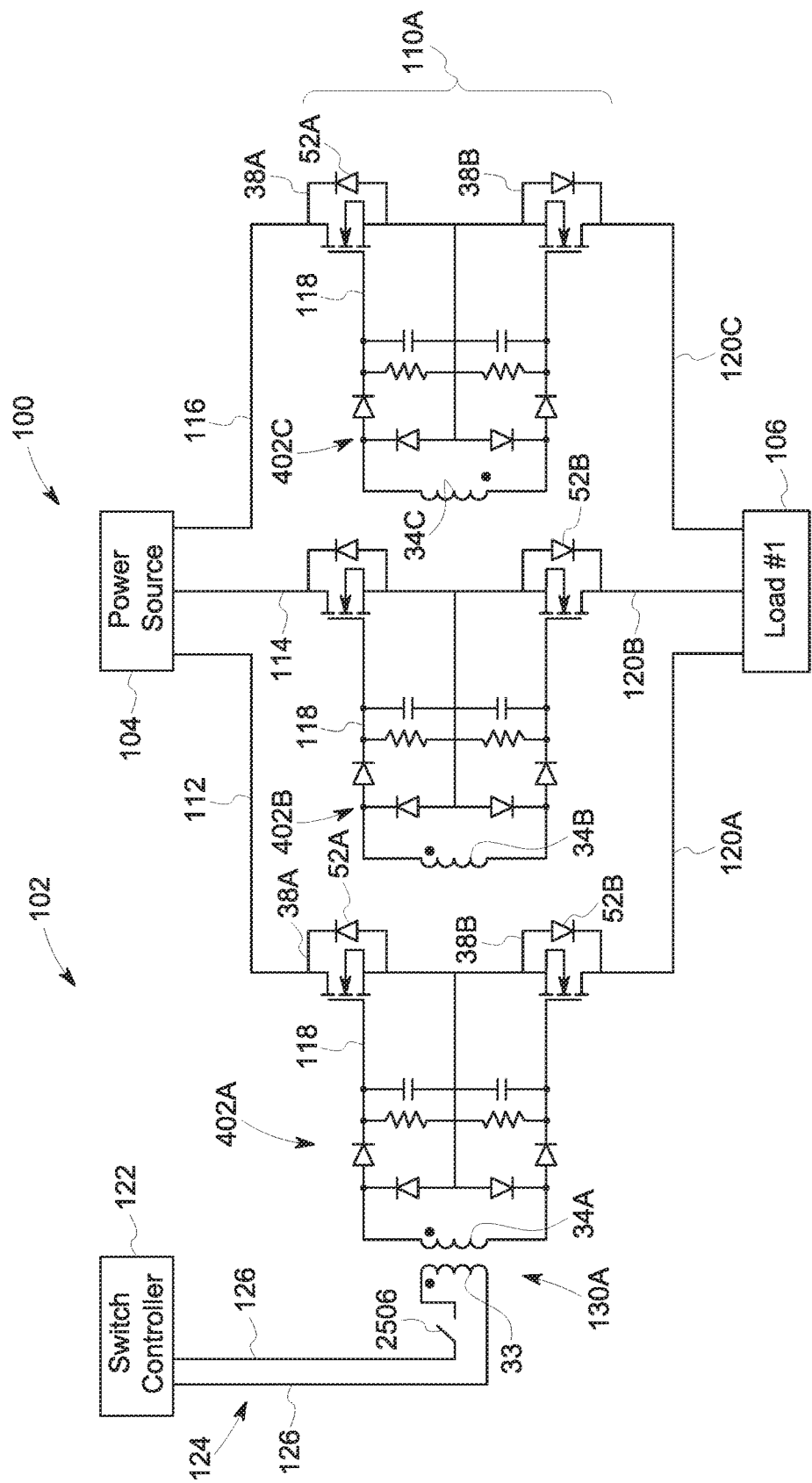
FIG. 12 illustrates a portion of the switching system and a portion of the power system according to an embodiment.

FIG. 12 illustrates a portion of the switching system 102 and a portion of the power system 100 according to an embodiment. For example, FIG. 12 omits the second switching assembly 110B, the second transformer 130B, and the second load 108. When the first switching assembly 110A is activated, the three phases of current conduct from the power source 104 along the corresponding power conductors 112, 114, 116 and through the upper and lower switching devices 38A, 38B to the first load 106 via the power conductors 120A-C. The switch cells 118 in the three sets 402A-C of switch cells 118 are arranged such that the upper switching device 38A is between the power source 104 and the lower switching device 38B, and the lower switching device 38B is between the upper switching device 38A and the first load 106.

In an embodiment, some of the secondary windings 33 have different polarities than each other. For example, in the illustrated embodiment the primary winding 33 of the first transformer 130A has the same polarity as the secondary windings 34A, 34B of the switch cells 118 in the first and second sets 402A, 402B, and the opposite polarity as the secondary winding 34C of the switch cell 118 in the third set 402C. The polarity of the windings 33, 34A-C may be based on a direction that the windings are coiled, such as clockwise or counter-clockwise relative to a common reference point.

Figure 13:
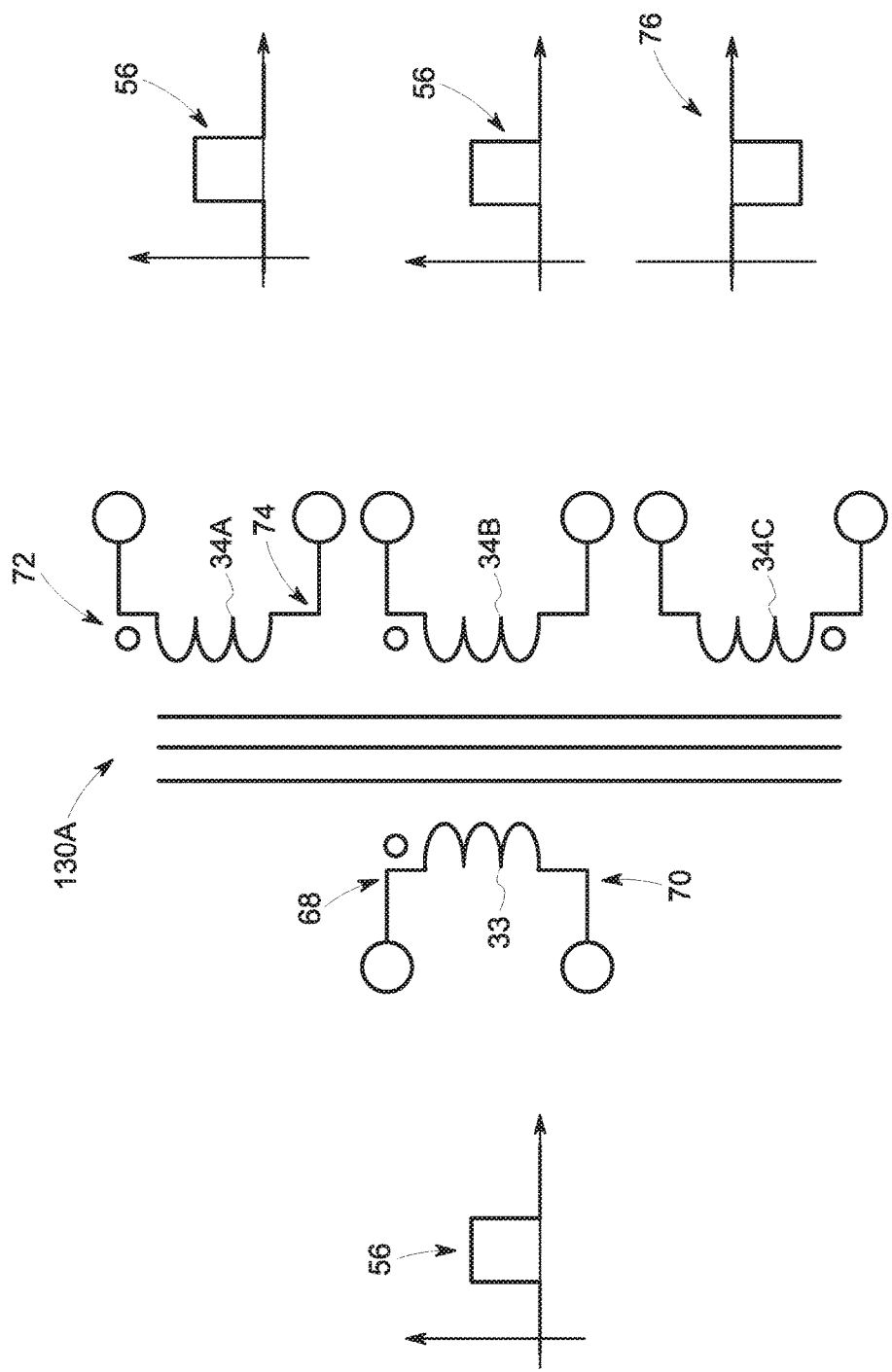
FIG. 13 shows a schematic diagram of a first transformer according to an embodiment.

FIG. 13 shows a schematic diagram of the first transformer 130A according to an embodiment. As shown in FIG. 13, receipt of unipolar positive voltage pulse 56 at the primary winding 33 causes a positive potential to be applied at the top end 68 of the primary winding 33 and a negative potential to be applied at the bottom end 70 of the primary winding 33. The transformer 130A transfers these potentials to the secondary windings 34A-C. Since the secondary windings 34A, 34B have the same polarity as the primary winding 33 (as indicated by the location of the dots), the top ends 72 of the secondary windings 34A, 34B have a positive potential and the bottom ends 74 of the secondary windings 34A, 34B have a negative potential. As a result, both of the secondary windings 34A, 34B convey the unipolar positive voltage pulse 56 to the corresponding switch cells 118 conductively coupled to the secondary windings 34A, 34B. However, since the secondary winding 34C has the opposite polarity as the primary winding 33, the top end 72 of the secondary winding 34C has a negative potential and the bottom end 74 has a positive position. As a result, the secondary winding 34C conveys a unipolar negative voltage pulse 76 to the switch cell 118 conductively coupled thereto. Therefore, the unipolar positive voltage pulse 56 transmitted to the primary winding 33 would cause the upper switching devices 38A of the switch cells 118 in the first and second sets 402A, 402B to close (while the lower switching devices 38B remain open), and the lower switching device 38B of the switch cell 118 in the third set 402C to close (while the upper switching device 38A remains open). In an alternative embodiment, two out of the three secondary windings 34A-C may have an opposite polarity as the primary winding 33 and/or a secondary winding other than the secondary winding 34C may have an opposite polarity as the primary winding 33.

Referring now back to FIG. 12, in order to turn ON the first switching assembly 110A to conduct the three-phase current to the first load 106, the switch controller 122 is configured to transmit an activation control signal to the first transformer 130A to activate all of the switch cells 118 in the sets 402A-C. The activation control signal is bipolar and includes both positive and negative voltage pulses, which closes both the upper and lower switching devices 38A, 38B, regardless of the polarities of the secondary windings 34A-C. The switch controller 122 sends a train of activation control signals to keep the sets 402A-C of switch cells 118 activated and conducting.

In order to turn OFF the first switching assembly 110A to stop the conduction of the three-phase current to the first load 106, the switch controller 122 is configured to transmit a deactivation control signal to the first transformer 130A, but only within designated turn-off time periods. The turn-off time periods occur when the multiple phases of current supplied by the power source 104 have designated positive or negative polarities. The turn-off time periods may be based on the polarities of the secondary windings 34A-C conductively coupled to the sets 402A-C of switch cells 118. The deactivation control signal includes a unipolar positive voltage pulse or a unipolar negative voltage pulse. As described with reference to FIGS. 7-9, the switch cells 118 avoid the risk of damage and energy loss by deactivating the switch cells 118 using the diodes 52A, 52B when the currents switch polarities.

Figure 14:
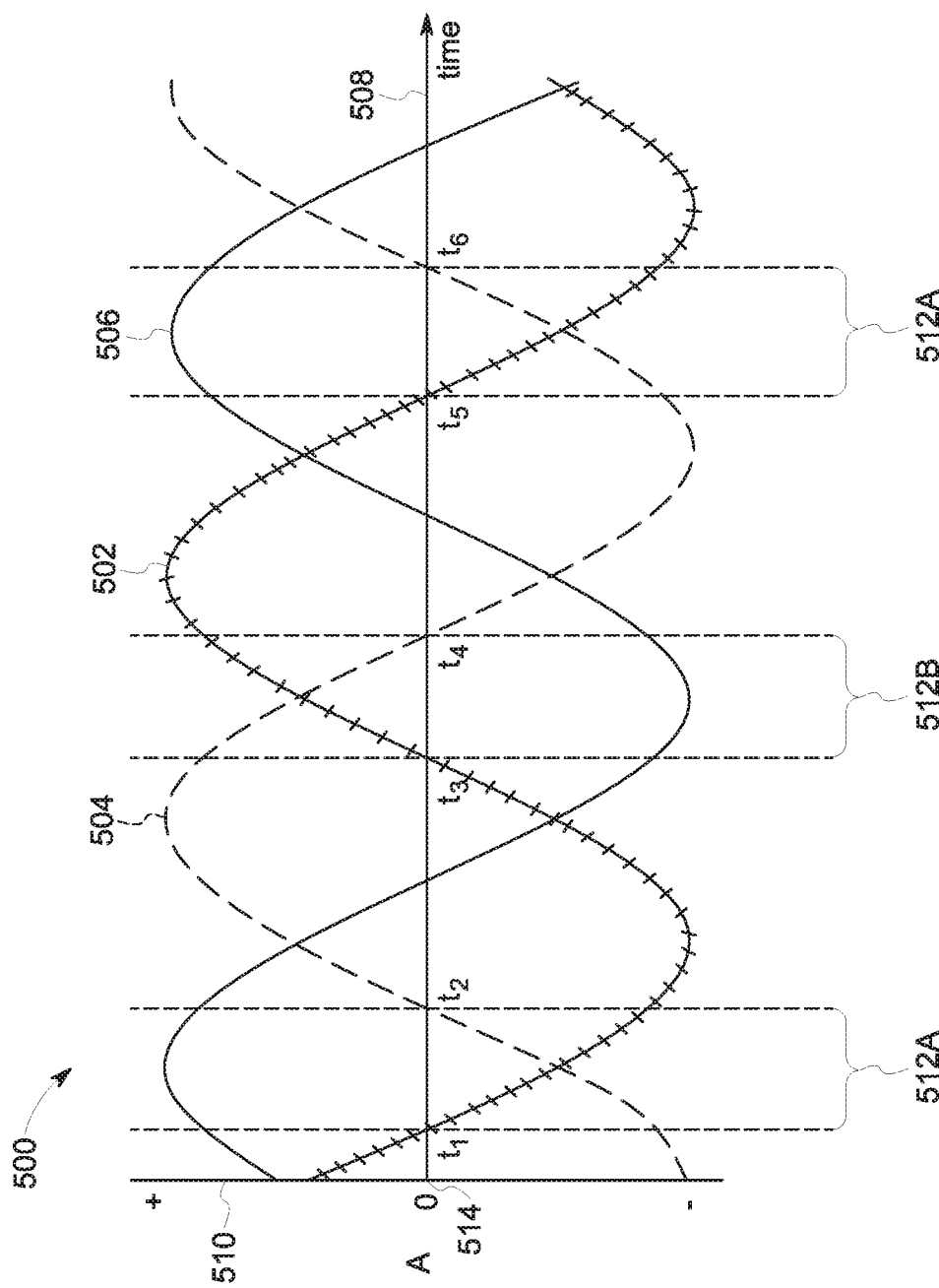
FIG. 14 is a graph plotting a first current waveform, a second current waveform, and a third current waveform according to an embodiment.

FIG. 14 is a graph 500 plotting a first current waveform 502, a second current waveform 504, and a third current waveform 506 according to an embodiment along a horizontal axis 508 representative of time and a vertical axis 510 representative of magnitude of current in both positive and negative directions or polarities. For example, the first current waveform 502 may represent a first phase of the three-phase current supplied by the power source 104 and controlled by the first set 402A of switch cells 118. The second and third current waveforms 504, 506 may represent the second and third phases of the three-phase current, respectively, that are controlled by the respective second and third sets 402B, 402C of switch cells 118. With additional reference to FIG. 12, since the secondary windings 34A, 34B of the transformer 130A have the same polarity and the secondary winding 34C has an opposite polarity than the secondary windings 34A, 34B, the turn-off time periods are times in which the first and second phases of current supplied by the power source 104 have the same polarity and the third phase of current has the opposite polarity. The turn-off time periods are shown in FIG. 14. There are two different turn-off time periods, a first turn-off time period 512A occurs when the first and second phases of current 502, 504 have a negative polarity and the third phase of current 506 has a positive polarity. Since the waveforms 502-506 are sinusoidal and repeat, the first turn-off time period 512A is shown twice on the graph 500, first between times $t_1$ and $t_2$, and then between times $t_5$ and $t_6$. The second turn-off time period 512B occurs when the first and second phases of current 502, 504 have a positive polarity and the third phase of current 506 has a negative polarity, as shown between times $t_3$ and $t_4$.

In an embodiment, the switch controller 122 is configured to only transmit deactivation control signals during the turn-off time periods 512A, 512B. Furthermore, the switch controller 122 determines whether to transmit the deactivation control signal as a unipolar positive voltage pulse or a unipolar negative voltage pulse. The determination is based on the turn-off time period 512A or 512B during which the switch controller 122 will be transmitting the deactivation control signal. For example, if the switch controller 122 receives an input between times $t_2$ and $t_3$ to deactivate the switching assembly 110A, the switch controller 122 continues to transmit activation control signals until time $t_3$. At time $t_3$, which is the beginning of the second turn-off time period 512B, the switch controller 122 transmits a deactivation control signal. Since the first and second phases 502, 504 have positive polarities and the third phase 506 has a negative polarity, the deactivation control signal has a unipolar positive voltage pulse. As shown in FIG. 12, the unipolar positive voltage pulse causes the upper switching devices 38A in the switch cells 118 of the first and second sets 402A, 402B to remain closed and conducting, while the lower switching devices 38B open, as depicted in FIG. 8. The currents therefore are directed along the diodes 52B of the lower switching devices 38B. With respect to the third set 402C of switch cells that are conductively coupled to the secondary winding 34C having the opposite polarity as the other secondary windings 34A, 34B, the unipolar positive voltage pulse becomes a unipolar negative voltage pulse as shown in FIG. 13. The negative voltage pulse causes the lower switching device 38B in the switch cells 118 of the third set 402C to remain closed and conducting, while the upper switching device 38A opens, as depicted in FIG. 9. The third phase of current is transmitted along the diode 52A.

At or proximate to time $t_4$, the switch controller 122 may cease transmitting electrical energy to the first transformer 130A without risk of damage or significant energy loss. The switch controller 122 may cease transmitting electrical energy by ceasing to transmit control signals to the first transformer 130A and/or by opening the switch 2506 to break the conductive path.

In another example, if the switch controller 122 receives the input to deactivate the switching assembly 110A between times $t_4$ and $t_5$, the switch controller 122 would wait until time $t_5$ to transmit the deactivation control signals. The deactivation control signals would be unipolar negative voltage pulses, instead of positive voltage pulses, due to the polarities of the three currents 502-506 during the first turn-off time period 512A. The switch controller 122 may cease transmitting electrical energy to the first transformer 130A without risk of damage or significant energy loss at or proximate to time $t_6$.

Figure 15:
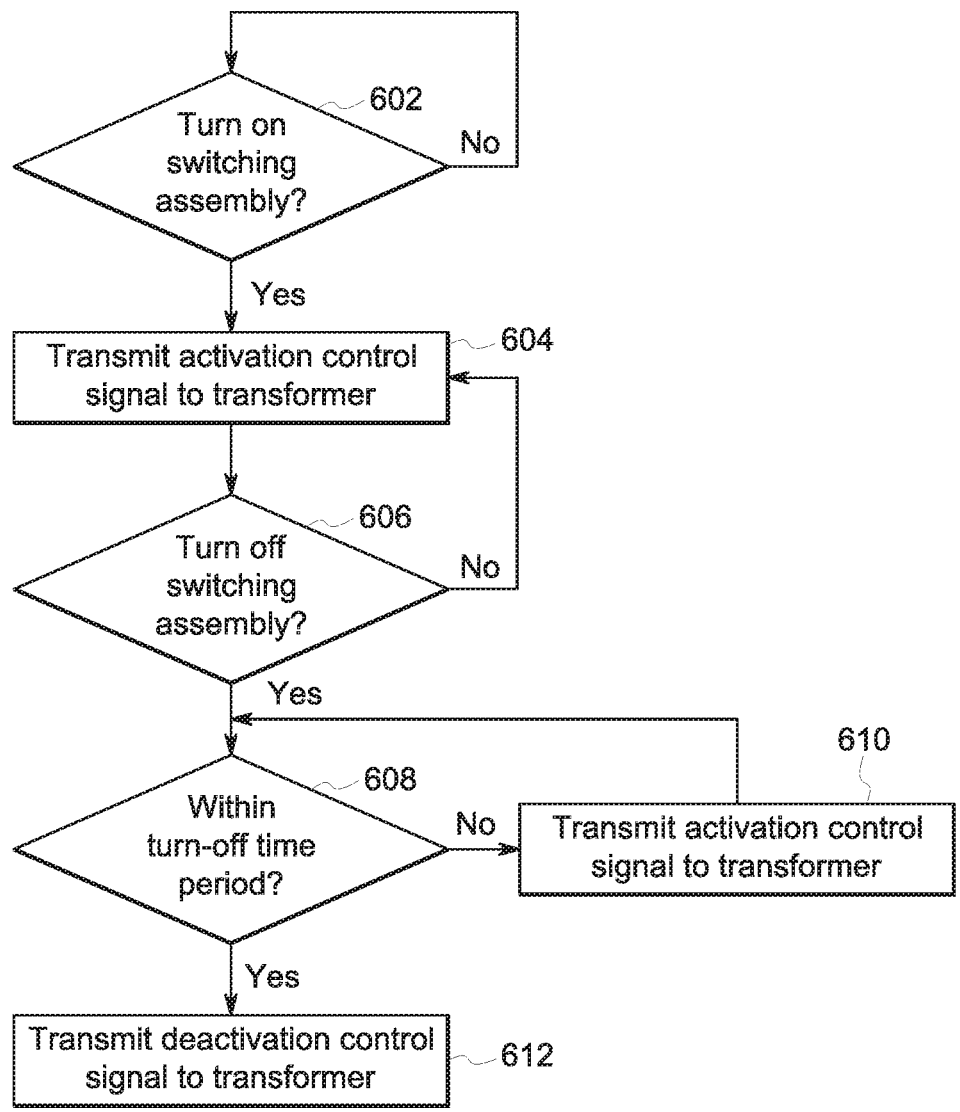
FIG. 15 is a flow chart of one embodiment of a method for operating a switching assembly to control conduction of multiple phases of electric current to a load.

FIG. 15 is a flow chart of one embodiment of a method 600 for operating a switching assembly to control conduction of multiple phases of electric current to a load. For example, the method 600 may be used to control whether or not three-phase current from a power source is supplied to the load. The method 600 may be performed by the switching system 102 shown in FIGS. 1 and 10, such that the switching assembly may be the first or second switching assemblies 110A, 110B. At least some of the steps of the method 600 may be performed by the switch controller 122.

At 602, a determination is made whether to turn ON the switching assembly in order to conduct multi-phase current from the powers source to the load. The switching assembly includes multiple sets of switch cells, and the switch cells are activated to conduct current therethrough when the switching assembly is in the ON state. The switch controller may be configured to receive an input, such as a user input or a sensor input, which prompts the switch controller to turn ON the switching assembly. For example, a user input may be received from a user input device to allow an operator to provide a user command to turn ON the switching assembly. Alternatively, or in addition, a sensor that monitors the load or another load may signal that the switching assembly should be turned ON, such as if a different load that is currently operating requires maintenance, necessitating operation of the load connected to the switching assembly. In another embodiment, the switch controller may determine to turn ON the switching assembly based on the ending of a designated time interval or another triggering event. If the switching assembly is not to be turned ON, then the method 600 may restart. If, on the other hand, the switching assembly should be turned ON, flow continues to 604.

At 604, an activation control signal is transmitted to a transformer, which conveys the activation control signal to each of the sets of switch cells in the switching assembly via secondary windings. The activation control signal is a bipolar signal that includes both positive voltage pulses and negative voltage pulses. For example, the activation control signal may be an alternating current. The positive voltage pulses are configured to close (e.g., allow conduction) one switching device in each switch cell, and the negative voltage pulses are configured to close the other switching device in each switch cell, such that a current conducts through the switch cells from the power source to the load. The activation control signal may be transmitted by the switch controller, which may transmit a series or train of such signals to maintain the switch cells in an activated and conducting state.

At 606, a determination is made whether to turn OFF the switching assembly to stop the conduction of multiple phases of current from the power source to the load. For example, the load may require maintenance or repair, such that the power supply to the load should be stopped. As described in 602, the determination may be based on an internal triggering event in the switch controller, such as the ending of a designated time period, or a received input from an operator, a sensor, or another controller device. If the switching assembly is not to be turned OFF, flow of the method 600 returns to 604, and one or more additional activation control signals are transmitted to the switching assembly to maintain the switch cells in the activated state. On the other hand, if the switching assembly should be turned OFF, then flow continues to 608.

At 608, a determination is made whether it is currently within a turn-off time period. The turn-off time period is a time period in which the multiple phases of current have designated polarities. There may be multiple turn-off time periods. If the determination is made to turn OFF the switching assembly 606 outside of a turn-off time period, then the method 600 continues to 610 and an activation control signal is transmitted to the transformer. After transmitting the activation control signal at 610, flow returns to 608 to determine again whether it is currently within a turn-off time period. Once it is within a turn-off time period, flow continues to 612 and a deactivation control signal is transmitted to the transformer. The deactivation control signal has a unipolar positive voltage pulse or a unipolar negative voltage pulse, but not both. The polarity of the unipolar voltage pulse is based on the polarities of the phases of current and the polarities of the secondary windings of the transformer. The deactivation control signal is configured to open one of the two switching devices in each of the switch cells to allow a diode of the open switching device to block the flow of current. The deactivation control signal may be transmitted by the switch controller until the end of the turn-off time period, at which time the switch controller may cease transmitting electrical current to the transformer to deactivate all of the switch cells. Flow of the method 600 can return to 602. Alternatively, operation of the method 600 may terminate.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

In an embodiment, a switching system is provided that includes a switching assembly for controlling conduction of multiple phases of current from a power source to a first load, and a transformer. The switching assembly includes multiple sets of switch cells conductively coupled to different power conductors that extend between the power source and the first load. The power conductors conduct different phases of current such that each set of switch cells is configured to control conduction of a different phase of current to the first load. The switch cells include first and second solid state switching devices having respective diodes. The diode of the first solid state switching device is conductively coupled in an opposite direction to the diode of the second solid state switching device. The transformer has a primary winding and multiple secondary windings that are conductively coupled to the sets of switch cells. The transformer is configured to convey an activation control signal from the primary winding to the sets of switch cells via the secondary windings. Responsive to receiving the activation control signal, the sets of switch cells are configured to activate to conduct the multiple phases of current from the power source to the first load along the power conductors.

Optionally, the switching assembly has three sets of switch cells. The three sets of switch cells are configured to conduct different phases of current to the first load when activated to provide three-phase current to power the first load.

Optionally, the activation control signal is bipolar and has a positive voltage pulse and a negative voltage pulse. The positive voltage pulse closes one of the first and second solid state switching devices in the switch cells. The negative pulse voltage closes the other of the first and second solid state switching devices in the switch cells. The sets of switch cells activate responsive to the first and second solid state switching devices of the switch cells in the corresponding set closing.

Optionally, the switch cells further include a first capacitor and a second capacitor conductively coupled between the corresponding secondary winding of the transformer and the first and second solid state switching devices. The first capacitor is conductively coupled with the first solid state switching device and configured to store electric energy received from the transformer to close the first solid state switching device responsive to the electric energy stored in the first capacitor exceeding an activation voltage threshold of the first switching device. The second capacitor is conductively coupled with the second solid state switching device and configured to store electric energy received from the transformer to close the second solid state switching device responsive to the electric energy stored in the second capacity exceeding an activation voltage threshold of the second switching device.

Optionally, the switching assembly and the transformer are configured to be disposed beneath a surface of earth to conduct the multiple phases of current to the first load disposed beneath the surface. The first load is a motor of a subterranean pump for pumping a resource to the surface. The power source is disposed at the surface and the power conductors extend underground from the power source to the motor.

Optionally, the switching system further includes a switch controller disposed at the surface and configured to generate the activation control signal. The switch controller is conductively coupled to the primary winding of the transformer via a pair of signal conductors extending underground from the switch controller to the primary winding.

Optionally, the switching assembly and the transformer are a first switching assembly and a first transformer, respectively. The switching system further includes a second switching assembly for controlling conduction of multiple phases of current from the power source to a second load and a second transformer. The second switching assembly includes multiple sets of switch cells conductively coupled to the same power conductors as the sets of switch cells in the first switching assembly. The second transformer has a primary winding and multiple secondary windings that are conductively coupled to the sets of switch cells of the second switching assembly. The sets of switch cells in the second switching assembly are configured to activate responsive to receiving the activation control signal from the second transformer to conduct multiple phases of current from the power source to the second load along the power conductors.

Optionally, the sets of switch cells in the switching assembly each includes at least two switch cells conductively coupled to one other in series.

Optionally, the transformer is configured to convey a deactivation control signal from the primary winding to the sets of switch cells via the secondary windings. The deactivation control signal is unipolar and has one of a positive voltage pulse or a negative voltage pulse. The sets of switch cells in the switching assembly are configured to deactivate responsive to receiving the deactivation control signal to stop conduction of the multiple phases of current from the power source to the first load.

Optionally, the switch cells further include a bias capacitor conductively coupled with the first solid state switching device of the corresponding switch cell. The bias capacitor is configured to be conductively coupled with a bias transformer to receive a bias voltage via the bias transformer. The bias capacitor is configured to apply the bias voltage to the first solid state switching device to increase an activation voltage threshold of the first solid state switching device.

Optionally, the primary winding of the transformer and a primary winding of the bias transformer share at least one signal conductor that extends between the primary windings and a switch controller.

Optionally, at least one of the secondary windings has a same polarity as the primary winding of the transformer and at least one of the secondary windings has an opposite polarity as the primary winding.

In another embodiment, a switching system is provided that includes a switching assembly for controlling conduction of multiple phases of current from a power source to a first load, a transformer, and a switch controller. The switching assembly includes multiple sets of switch cells conductively coupled to different power conductors that extend between the power source and the first load. The power conductors conduct different phases of current such that each set of switch cells is configured to control conduction of a different phase of current to the first load. The switch cells include first and second solid state switching devices having respective diodes. The diode of the first solid state switching device is conductively coupled in an opposite direction to the diode of the second solid state switching device. The transformer has a primary winding and multiple secondary windings that are conductively coupled to the sets of switch cells. The switch controller is conductively coupled to the primary winding via a pair of signal conductors. The switch controller is configured to transmit an activation control signal via the pair of signal conductors to the primary winding. The activation control signal is conveyed from the primary winding to the sets of switch cells via the secondary windings. Responsive to receiving the activation control signal, the sets of switch cells are configured to activate to conduct the multiple phases of current from the power source to the first load along the power conductors.

Optionally, the activation control signal is bipolar and has a positive voltage pulse and a negative voltage pulse. The positive voltage pulse closes one of the first and second solid state switching devices in the switch cells. The negative pulse voltage closes the other of the first and second solid state switching devices in the switch cells. The sets of switch cells activate responsive to the first and second solid state switching devices of the switch cells in the corresponding set closing.

Optionally, the switching assembly and the transformer are configured to be disposed beneath a surface of earth and the switch controller is configured to be disposed at the surface. The pair of signal conductors extend underground from the switch controller to the transformer. The first load is a motor of a subterranean pump that is disposed beneath the surface for pumping a resource to the surface. The power source is disposed at the surface and the power conductors extend underground from the power source to the motor.

Optionally, the switch cells further include a first capacitor and a second capacitor conductively coupled between the corresponding secondary winding of the transformer and the first and second solid state switching devices. The first capacitor is conductively coupled with the first solid state switching device and is configured to store electric energy received from the transformer to close the first solid state switching device responsive to the electric energy stored in the first capacitor exceeding an activation voltage threshold of the first switching device. The second capacitor is conductively coupled with the second solid state switching device and is configured to store electric energy received from the transformer to close the second solid state switching device responsive to the electric energy stored in the second capacity exceeding an activation voltage threshold of the second switching device.

Optionally, the switch controller is configured to transmit a deactivation control signal to the sets of switch cells via the pair of signal conductors and the transformer. The deactivation control signal is unipolar and has one of a positive voltage pulse or a negative voltage pulse. The sets of switch cells in the switching assembly are configured to deactivate responsive to receiving the deactivation control signal to stop conduction of the multiple phases of current from the power source to the first load.

Optionally, the switch controller is configured to transmit the deactivation control signal to the sets of switch cells during turn-off time periods. The turn-off time periods represent times during which the multiple phases of current have designated polarities. The switch controller is configured to not transmit the deactivation control signal outside of the turn-off time periods.

In yet another embodiment, a switching system is provided that includes a transformer and a switching assembly for controlling conduction of three-phase current from a power source to a motor of a subterranean pump that is disposed beneath a surface of earth for pumping a resource to the surface. The switching assembly includes three sets of switch cells disposed beneath the surface. Each of the three sets of switch cells is conductively coupled to a different power conductor of three power conductors that extend from the power source at the surface to the motor. The power conductors conduct different phases of current relative to one another such that each set of switch cells is configured to control conduction of a different phase of current to the motor. The switch cells include first and second solid state switching devices having respective diodes. The diode of the first solid state switching device is conductively coupled in an opposite direction to the diode of the second solid state switching device in the same switch cell. The transformer is configured to be disposed beneath the surface. The transformer includes a primary winding conductively coupled to a pair of signal conductors that extend from the primary winding to the surface. The transformer further includes at least three secondary windings that are conductively coupled to the three sets of switch cells. The transformer is configured to convey a control signal that is received from the surface via the pair of signal conductors to the three sets of switch cells via the secondary windings. The control signal is configured to at least one of activate the three sets of switch cells to conduct the three-phase current from the power source to the motor or deactivate the three sets of switch cells to stop conduction of the three-phase current from the power source to the motor.

Optionally, responsive to the control signal being bipolar and having a positive voltage pulse and a negative voltage pulse, both the first and second solid state switching devices in the switch cells are configured to close to activate the three sets of switch cells to conduct the three-phase current from the power source to the motor.

It should be noted that the particular arrangement of components (e.g., the number, types, placement, or the like) of the illustrated embodiments may be modified in various alternate embodiments. In various embodiments, different numbers of a given system or unit may be employed, a different type or types of a given system or unit may be employed, a number of systems or units (or aspects thereof) may be combined, a given system or unit may be divided into plural systems (or sub-systems) or units (or sub-units), a given system or unit may be added, or a given system or unit may be omitted.

It should be noted that the various embodiments may be implemented in hardware, software or a combination thereof. The various embodiments and/or components, for example, the systems, or components and controllers therein, also may be implemented as part of one or more computers or processors. The computer or processor may include a computing device, an input device, a display unit, and an interface. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "system" may each include any processor-based or microprocessor-based system including systems using microcontrollers, reduced instruction set computers (RISC), application specific integrated circuits (ASICs), logic circuits, graphics processing units (GPUs), field-programmable gate arrays (FPGAs), and any other circuit or processor capable of executing the functions described herein. The above examples are exemplary only, and are thus not intended to limit in any way the definition and/or meaning of the term "controller," "system," or "computer."

The computer, controller, system, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, controller, system, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs, systems, or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A switching system comprising:
a switching assembly for controlling conduction of multiple phases of current from a power source to a first load, the switching assembly including multiple sets of switch cells conductively coupled to different power conductors that extend between the power source and the first load, the power conductors conducting different phases of current such that each set of switch cells is configured to control conduction of a different phase of current to the first load, the switch cells including first and second solid state switching devices having respective diodes, the diode of the first solid state switching device conductively coupled in an opposite direction to the diode of the second solid state switching device; and
a transformer having a primary winding and multiple secondary windings that are conductively coupled to the sets of switch cells, the transformer configured to convey an activation control signal from the primary winding to the sets of switch cells via the secondary windings;

wherein, responsive to receiving the activation control signal, the sets of switch cells are configured to activate to conduct the multiple phases of current from the power source to the first load along the power conductors.

2. The switching system of claim 1, wherein the switching assembly has three sets of switch cells, the three sets of switch cells configured to conduct different phases of current to the first load when activated to provide three-phase current to power the first load.

3. The switching system of claim 1, wherein the activation control signal is bipolar and has a positive voltage pulse and a negative voltage pulse, the positive voltage pulse closing one of the first and second solid state switching devices in the switch cells, the negative pulse voltage closing the other of the first and second solid state switching devices in the switch cells, the sets of switch cells activating responsive to the first and second solid state switching devices of the switch cells in the corresponding set closing.

4. The switching system of claim 1, wherein the switch cells further include a first capacitor and a second capacitor conductively coupled between the corresponding secondary winding of the transformer and the first and second solid state switching devices, the first capacitor conductively coupled with the first solid state switching device and configured to store electric energy received from the transformer to close the first solid state switching device responsive to the electric energy stored in the first capacitor exceeding an activation voltage threshold of the first switching device, the second capacitor conductively coupled with the second solid state switching device and configured to store electric energy received from the transformer to close the second solid state switching device responsive to the electric energy stored in the second capacity exceeding an activation voltage threshold of the second switching device.

5. The switching system of claim 1, wherein the switching assembly and the transformer are configured to be disposed beneath a surface of earth to conduct the multiple phases of current to the first load disposed beneath the surface, the first load being a motor of a subterranean pump for pumping a resource to the surface, the power source disposed at the surface and the power conductors extending underground from the power source to the motor.

6. The switching system of claim 5, further comprising a switch controller disposed at the surface and configured to generate the activation control signal, the switch controller conductively coupled to the primary winding of the transformer via a pair of signal conductors extending underground from the switch controller to the primary winding.

7. The switching system of claim 1, wherein the switching assembly and the transformer are a first switching assembly and a first transformer, respectively, the switching system further comprising a second switching assembly for controlling conduction of multiple phases of current from the power source to a second load and a second transformer, the second switching assembly including multiple sets of switch cells conductively coupled to the same power conductors as the sets of switch cells in the first switching assembly, the second transformer having a primary winding and multiple secondary windings that are conductively coupled to the sets of switch cells of the second switching assembly, wherein the sets of switch cells in the second switching assembly are configured to activate responsive to receiving the activation control signal from the second transformer to conduct multiple phases of current from the power source to the second load along the power conductors.

8. The switching system of claim 1, wherein the sets of switch cells in the switching assembly each includes at least two switch cells conductively coupled to one other in series.

9. The switching system of claim 1, wherein the transformer is configured to convey a deactivation control signal from the primary winding to the sets of switch cells via the secondary windings, the deactivation control signal being unipolar and having one of a positive voltage pulse or a negative voltage pulse, the sets of switch cells in the switching assembly configured to deactivate responsive to receiving the deactivation control signal to stop conduction of the multiple phases of current from the power source to the first load.

10. The switching system of claim 1, wherein the switch cells further comprise a bias capacitor conductively coupled with the first solid state switching device of the corresponding switch cell, the bias capacitor configured to be conductively coupled with a bias transformer to receive a bias voltage via the bias transformer, the bias capacitor configured to apply the bias voltage to the first solid state switching device to increase an activation voltage threshold of the first solid state switching device.

11. The switching system of claim 10, wherein the primary winding of the transformer and a primary winding of the bias transformer share at least one signal conductor that extends between the primary windings and a switch controller.

12. The switching system of claim 1, wherein at least one of the secondary windings has a same polarity as the primary winding of the transformer and at least one of the secondary windings has an opposite polarity as the primary winding.

* * * * *